(12) United States Patent
Cordes et al.

(10) Patent No.: US 11,756,279 B1
(45) Date of Patent: *Sep. 12, 2023

(54) TECHNIQUES FOR DEPTH OF FIELD BLUR FOR IMMERSIVE CONTENT PRODUCTION SYSTEMS

(71) Applicant: LUCASFILM ENTERTAINMENT COMPANY LTD., San Francisco, CA (US)

(72) Inventors: Roger Cordes, San Francisco, CA (US); Lutz Latta, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/524,276

(22) Filed: Nov. 11, 2021

Related U.S. Application Data

(63) Continuation of application No. 16/999,893, filed on Aug. 21, 2020, now Pat. No. 11,200,752.

(60) Provisional application No. 62/891,052, filed on Aug. 23, 2019.

(51) Int. Cl.
*G06T 19/20* (2011.01)
*G06T 7/90* (2017.01)

(52) U.S. Cl.
CPC .............. *G06T 19/20* (2013.01); *G06T 7/90* (2017.01); *G06T 2207/10024* (2013.01); *G06T 2219/2012* (2013.01)

(58) Field of Classification Search
CPC .............................. G06T 19/006; G06T 19/20
See application file for complete search history.

(56) References Cited

U.S. PATENT DOCUMENTS

| | | | |
|---|---|---|---|
| 8,791,947 B1 * | 7/2014 | Kontkanen | G06T 15/00 345/420 |
| 11,107,195 B1 | 8/2021 | Cordes et al. | |
| 2002/0109701 A1 | 8/2002 | Deering | |
| 2009/0002501 A1 | 1/2009 | Silsby et al. | |

(Continued)

OTHER PUBLICATIONS

U.S. Appl. No. 16/999,893, "Non-Final Office Action", dated Apr. 16, 2021, 18 pages.

(Continued)

*Primary Examiner* — Charles Tseng
(74) *Attorney, Agent, or Firm* — Kilpatrick Townsend & Stockton LLP

(57) ABSTRACT

An immersive content generation system can capture a plurality of images of an object in the performance area using a camera. The object is at least partially surrounded by one or more displays presenting images of a virtual environment. The system can determine attributes of a lens of the taking camera, a first distance from the taking camera to the physical object, and a second distance between a LED display presenting a virtual image of the physical object and the taking camera. The system can determine the depth of field blur for the virtual objects based on the attributes of the taking camera and the virtual depth of each of the virtual objects. The system can apply the depth of field blur to the virtual objects and generate content based on the plurality of captured images and the determined amount of depth of field blur to the virtual objects.

20 Claims, 13 Drawing Sheets

(56) References Cited

U.S. PATENT DOCUMENTS

| | | |
|---|---|---|
| 2015/0245020 A1 | 8/2015 | Meier et al. |
| 2015/0350628 A1 | 12/2015 | Sanders et al. |
| 2017/0148217 A1 | 5/2017 | Poursohi et al. |
| 2017/0160518 A1* | 6/2017 | Lanman ............. G02B 27/0093 |
| 2017/0243406 A1 | 8/2017 | Yamazaki |
| 2017/0249742 A1 | 8/2017 | Kadri et al. |
| 2018/0322688 A1 | 11/2018 | Ozguner et al. |
| 2019/0318526 A1* | 10/2019 | Hunt .................... G06T 19/006 |
| 2019/0378326 A1 | 12/2019 | Ito |

OTHER PUBLICATIONS

U.S. Appl. No. 16/999,893, "Notice of Allowance", dated Aug. 13, 2021, 10 pages.

Joshi et al., "Image Deblurring Using Inertial Measurement Sensors", Association for Computing Machinery Transactions on Graphics, vol. 29, No. 4, Jul. 2010, pp. 1-9.

* cited by examiner

TECHNIQUES FOR DEPTH OF FIELD BLUR FOR IMMERSIVE CONTENT PRODUCTION SYSTEMS

RELATED APPLICATION(S)

This application is a continuation of U.S. application Ser. No. 16/999,893, filed Aug. 21, 2021, entitled "Color Correction for Immersive Content Production Systems," which claims priority to U.S. Provisional Patent Application Ser. No. 62/891,052, filed Aug. 23, 2019, entitled "Color Correction, Motion Blur, And Depth Of Field For Immersive Content Production System," which are herein incorporated by reference in their entirety and for all purposes.

This application is related to U.S. application Ser. No. 16/999,979, now U.S. Pat. No. 11,107,195, entitled "Motion Blur And Depth Of Field For Immersive Content Production Systems" by Cordes et al., which is incorporated herein by reference.

FIELD

The present disclosure generally relates to generating content using one or more displays configured for operation in an immersive content production system. In some embodiments, the images shown on the displays may be color corrected in real-time or at interactive frame rates. The images may also have appropriate motion blur and depth of field applied.

BACKGROUND

Immersive content systems allow for capturing the performance of actors in a performance area using one or more cameras. The performance area can be at least partially enclosed with one or more walls and ceiling of display screens. The scene can include both live actors and props and virtual elements (e.g., a virtual sun or street lamp) displayed on the one or more displays.

In some instances, the colors of virtual objects on a display of the immersive cave or walls may not match or may become unsynchronized with the real world colors of the actors and physical objects within the performance area. This could be a result of changing lighting patterns, light from the displays illuminating the actors, etc. As a result, content generated from images captured by the taking camera may not appear realistic to viewers due to color discrepancies between the virtual and physical objects.

In some instances, effects can be employed to give the perception of motion of an object on stage. For example, a vehicle can be on the stage and techniques can be employed to give the viewer a perception that the vehicle is moving. This can be accomplished by projecting images on the immersive displays to give the perception of motion. However, as a taking camera moves with respect to the displays, this perception of motion can become blurred due to the motion of the taking camera.

For cameras that can only focus on one object distance at a time, Depth of Field (DOF) is the distance between the nearest and the farthest objects that are in acceptably sharp focus. Acceptably sharp focus is defined using a property called the circle of confusion. The depth of field can be determined by focal length, distance to subject, the acceptable circle of confusion size, and aperture. Precise focus is only possible at an exact distance from the lens; at that distance, a point object will produce a point image. Otherwise, a point object will produce a blur spot shaped like the aperture, typically and approximately a circle. When this circular spot is sufficiently small, it is visually indistinguishable from a point, and appears to be in focus. The diameter of the largest circle that is indistinguishable from a point is known as the acceptable circle of confusion, or informally, simply as the circle of confusion. Points that produce a blur spot smaller than this acceptable circle of confusion are considered acceptably sharp. DOF calculations become more difficult when images are displayed on an immersive content display because of the different distances between the taking camera and the object and the virtual image of the object on the immersive content display.

SUMMARY

In order to have the colors of the displayed virtual objects, actors, and physical objects match visually, the content production system may adjust the color of the virtual objects shown on the display in real-time (or at interactive frame rates) based on the color of the actors and physical objects in the earlier images (i.e., frames) of a given performance. More specifically, the content production system may automatically or periodically receive input from a user to generate a set of 3D volumes. Each of the 3D volumes may surround one or more virtual objects in a virtual environment to be displayed on the displays of the content production system. In some embodiments, the content generation system may present an input tool to enable the user to draw or otherwise define the boundaries of the volumes. In certain embodiments, the content generation system may additionally or alternatively generate volumes automatically.

The content production system updates or otherwise alters the colors of the virtual objects within the virtual environment in real-time (or at interactive frame rates). Additionally, in some instances, the content production system may use the tile binning operation to achieve fast frustum culling of off-screen color-correction volumes. More specifically, volumes that are determined to be off-screen based on the camera position, orientation, and other attributes may have a low priority or may not be color corrected at all.

According to some implementations, a method may include receiving a first user input that defines a three-dimensional (3D) volume within a performance area; capturing a plurality of images of an object in the performance area using a camera, wherein the object is at least partially surrounded by one or more displays presenting images of a virtual environment; receiving a second user input to adjust a color value of a virtual image of the object as displayed in the images in the virtual environment; performing a color correction pass for the displayed images of the virtual environment; and generating content based on the plurality of captured images that are corrected via the color correction pass.

The content production system may generate adjusted motion blur for the virtual objects shown on the displays of the system in response to movement of the taking camera and/or a stage in a performance area. More specifically, the content production system may determine velocity, acceleration, angle, orientation, and/or other movement related data for the taking camera and/or a stage within the performance area. Based on this information, the distance information of the physical objects from the taking camera, and the virtual distance information of the virtual objects from the taking camera, the content production system may determine an amount of motion blur to be applied to the virtual objects in the virtual environment. More specifically, the content production system may determine the amount of motion blur exhibited by images of the physical objects in the performance area.

The content production system may thereafter apply a similar amount of motion blur to the virtual objects shown on the display. In some embodiments, the content production system may apply a smaller amount of motion blur to the virtual objects relative to the amount of motion blur seen in the physical objects. In particular, the displays presenting the virtual objects may exhibit some motion blur themselves as the displays are also physical objects. As such, the content production system may apply an amount of motion blur equal to the difference between the amount of motion blur attributed to the physical objects in the performance area and the displays of the content production system. In this way, the virtual objects may exhibit an appropriate amount of motion blur in comparison to the physical objects within the performance area.

According to some implementations, a method may include capturing a plurality of images of a physical object in a performance area using a taking camera, wherein the physical object is at least partially surrounded by one or more displays presenting images of a virtual environment; determining an orientation and a velocity of the taking camera with respect to the physical object in the performance area; receiving an input regarding a desired motion effect for the physical object; calculating an amount of motion blur to apply to a virtual object in the virtual environment based at least in part on the desired motion effect and the orientation and velocity of the taking camera, wherein the calculated amount of motion blur corrects for blur caused by the orientation and the velocity of the taking camera; applying the amount of motion blur to the virtual object in the virtual environment; and generating content based on the plurality of captured images and the amount of motion blur.

The content production system may generate adjusted depth of field ("DOF") for virtual objects displayed on the displays of the content production system. More specifically, the content production system may determine attribute information for a lens used by the taking camera. The attribute information may indicate a focal length, lens aperture, and other attributes of the lens. The content production system may also determine the virtual depth of each of the virtual objects displayed on the displays of the content production system relative to the taking camera. Based on the lens attribute information and the virtual depth of each virtual object, the content production system may generate an appropriate amount of blur or "out of focus" quality for the virtual object.

In some embodiments, the content production system may apply a smaller amount of DOF as would normally be associated with objects having a particular distance from the taking camera. In particular, the displays presenting the virtual objects may exhibit some DOF themselves as the displays are physical objects. As such, the content production system may determine the amount of DOF associated with the displays based on the distance of the displays from the taking camera. Thereafter, the content production system may determine an amount of DOF to apply to each virtual object based on the determined amount of DOF for the displays. In particular, the content production system may reduce the amount of DOF to apply to the virtual objects by the determined amount of DOF for the displays. In this way, images of each virtual object may exhibit an appropriate amount of DOF for its given virtual distance.

According to some implementations, a method may include capturing a plurality of images of one or more physical objects in a performance area using a camera, wherein the one or more physical objects are at least partially surrounded by one or more displays presenting images of a virtual environment; determining one or more attributes of a lens of a taking camera; generating an image of one or more virtual objects representing the one or more physical objects in the virtual environment; determining a virtual depth of each of the one or more virtual objects on the one or more displays relative to the taking camera; determining an amount of blur for the one or more virtual objects based on the one or more attributes of the taking camera and the determined depth of each of the one or more virtual objects; applying the determined amount of blur to the one or more virtual objects in the virtual environment; and generating content based on the plurality of captured images and the determined amount of blur to the one or more virtual objects.

These and other embodiments are described in detail below. For example, other embodiments are directed to systems, devices, and computer readable media associated with methods described herein.

To better understand the nature and advantages of the present invention reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

Figure 1:
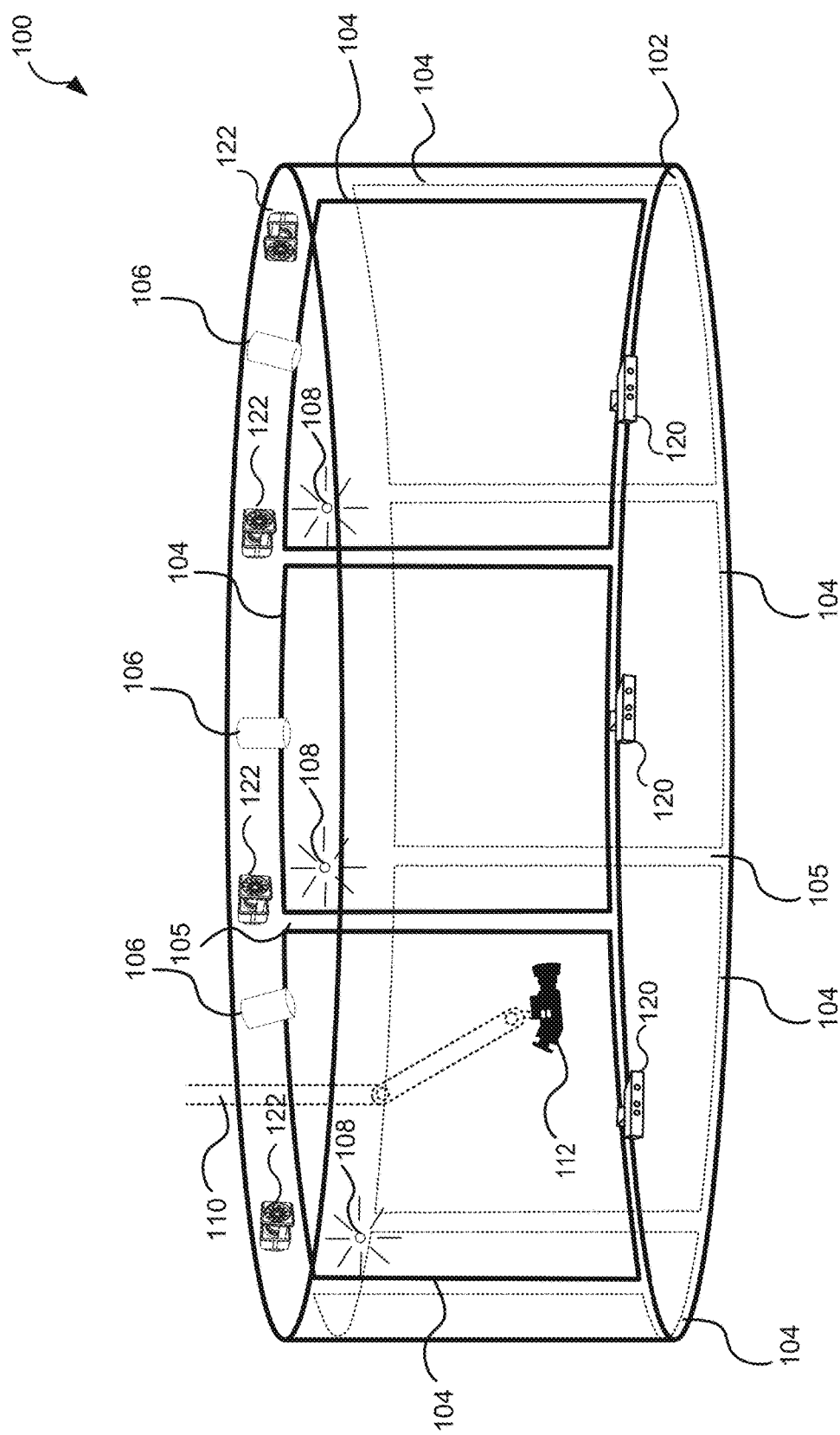
FIG. 1 illustrates an immersive content production system according to some embodiments of the invention.

Like reference, symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc., or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following detailed description of example implementations refers to the accompanying drawings. The same reference numbers in different drawings may identify the same or similar elements.

Embodiments are directed at an immersive content production system that includes a plurality of displays. Immersive content (e.g., virtual reality content, mixed reality content, augmented reality content, content configured for immersive caves/walls, etc.) may be leveraged as part of a system used by users (e.g., artists, engineers, technicians, directors, and other individuals involved in content production) in order to generate content (e.g., movies, television programming, online or streamed videos, etc.). As described herein, the immersive content production system may also be referred to as simply the content production system or production system.

In one aspect, the immersive content production system presents images in real-time or at interactive frame rates (e.g., 24, 30, 60, 120, or 240 frames per second) to users of the content production system. The images may be presented over immersive devices (e.g., virtual reality goggles and augmented reality glasses) or via an immersive environment, such as an immersive "cave" or one or more immersive "walls" (e.g., a performance area partially or completely surround with image displays). In one embodiment, the immersive environment may include a performance area, such as a stage. The performance area may be partially or completely surrounded by light emitting diode (LED) or liquid crystal display (LCD) display screens. For example, the performance area may include one or more walls and a ceiling of LED display screens enclosing or surrounding the performance area. Alternatively, the performance area may be partially or completely surrounded by projector screens. A set of projectors may additionally be configured to generate images on the projector screens. In some embodiments, the performance area may be partially or completely surrounded by a combination of LED or LCD display screens and projector screens. In some embodiments, the content production system may obtain virtual environment content and display the content on the image displays around the performance area. In this way, a performer/actor in the performance area may appear to be within the virtual environment. In some embodiments, the images displayed by the images displays are primarily background content (e.g., trees, buildings, the sun, etc.).

In various embodiments, the content production system can include one or more cameras usable for capturing a performance being performed by a performer in the performance area. The performance area may be, for example, a movie/television set, stage, stadium, park, etc. During the performance, the content production system may detect the motion and/or positioning of the performer. Such detection may be based on markers or sensors worn by the performer, depth and/or other motion detection sensors of the content production system (e.g., light detection and ranging (LIDAR)), motion capture cameras, etc. For example, an array of depth sensors may be positioned in proximity to and directed at the performance area. For instance, the depth sensors may surround the perimeter of the performance area. In some embodiments, the depth sensors measure the depth of different parts of the performer in the performance area over the duration of a performance. The depth information may then be stored and used by the content production system to determine the positioning of the performer over the performance.

In certain embodiments, a taking camera can be aimed at the performance area may capture the performance of the performer as well as the virtual environment displayed by the image displays (e.g., LED displays) behind the performer. In some embodiments, sensors may be used to determine the position and orientation of the taking camera during a performance. For example, Global Navigation Satellite System (GNSS) based sensors may be attached to the taking camera to determine its position within or relative to the performance area. As another example, other cameras may be directed at the taking camera configured to capture the performance. One or more markers may be attached to the taking camera. During a performance, the other cameras may capture images of the taking camera as the taking camera is moved and/or oriented during the performance. The production system may use the images captured of the taking camera to determine the movement and orientation of the taking camera during the performance. Such information may be used to support the content production process. For example, such information regarding the orientation and movement of the taking camera may be used to determine the distance of the taking camera from the performer over a performance. Based on the orientation and movement (and other attributes such as lens aperture and focal length) of the taking camera, the content production system may adjust the virtual environment displayed by the immersive cave or walls in real-time or at interactive frame rates to correspond to orientation and position of the camera. In this way, images of the virtual environment can be perspective-correct over a performance of the performer.

In order to better understand and appreciate aspects of the invention, reference is made to FIG. 1, which is a simplified illustration of an immersive content production system 100 according to an embodiment of the invention. Immersive content production system 100 can include a performance area 102 that is partially or completely surrounded by image displays 104 (sometimes referred to herein as just "displays"). Immersive content production system 100 can obtain virtual environment content and display the virtual environment content on the displays 104.

Performance area 102 can be, for example, a movie or television set, a stage, a stadium, a park, or the like. In one aspect, the immersive content production system 100 presents images in real-time or at interactive frame rates to users of the content production system (e.g., performers within performance area 102). Since the displays 104 surround or partially surround performance area 102, immersive content production system 100 can create an immersive environment (sometimes referred to as an immersive "cave" or immersive "walls") for performances that take place within the performance area 102. In this way, an actor or actress performing within performance area 102 can appear to be in the virtual environment.

In some embodiments, displays 104 are LED display screens or LCD display screens. For example, the performance area 102 can include one or more walls of LED or LCD displays 104 enclosing the performance area 102. Alternatively, the performance area 102 can be partially or completely surrounded by projector screens and a set of projectors can be configured to project images onto the projector screens. In some embodiments, the performance area 102 can be surrounded by a combination of LED display screens, LCD display screens and/or projector screens.

Embodiments of the invention are not limited to any particular size of the displays 104 or performance area 102. In some embodiments the displays can be 20-40 feet tall and the performance area 102 can be, for example, between 50-100 feet in diameter. In some embodiments, the displays 104 can include multiple displays 104 that are generally fixed in position and mostly surround the performance area 102 along with additional moveable or mobile displays 104 that can be moved into positions that create an immersive environment that extends completely or almost completely (i.e., 300-360 degrees) around performance area 102. As an example, in one embodiment fixed position displays 104 can extend approximately 270 degrees around performance area 102 while moveable displays 104 can be used to augment the fixed position displays to further extend the immersive environment up to 320 degrees or up to 360 degrees around the performance area 102. Additionally, while not shown in FIG. 1, in some embodiments, immersive content production system 100 can further include one or more displays 104 as a ceiling on performance area 102 and/or as part of the floor of the performance area 102. Also, while for ease of illustration, the displays 104 are shown in FIG. 1 as having a small space or gap 105 between them, the displays 104 can be installed in the immersive environment 100 as to be seamless with less than a threshold distance or even no space between adjacent displays 104.

A taking camera 112 can be attached to a rig 110 and can be aimed at the performance area 102 to capture the performance of a performer as well as the virtual environment displayed by the displays 104. In some embodiments, sensors can be used to determine the position and orientation of the taking camera 112 during a performance. For example, GPS based sensors (not shown) can be attached to the taking camera 112 to determine its position within or relative to the performance area 102. As another example, other cameras (e.g., motion capture cameras 122 discussed below) can be directed at the taking camera 112 configured to capture the performance and one or more markers can be attached to the taking camera 112. During a performance, the other cameras can capture images of the taking camera 112 as the taking camera 112 is moved and/or oriented during the performance. The immersive content production system 100 can use the images captured of the taking camera 112 to determine the movement and orientation of the taking camera 112 during the performance. Such information can be used to support the content production process. For example, such information regarding the orientation and movement of the taking camera 112 can be used to determine the distance of the taking camera 112 from the performer over a performance. Based on the orientation and movement (and other attributes such as lens aperture and focal length) of the taking camera 112, the immersive content production system 100 can adjust the virtual environment displayed by the immersive cave or walls in real-time or at interactive frame rates to correspond to orientation and position of the taking camera 112. In this way, images of the virtual environment can be perspective-correct over a performance of the performer.

In some embodiments, the immersive cave or walls can include one more lighting elements to provide lighting for performance area 102. For example, the immersive cave or walls can include supplemental lights 106 separate from displays 104 that can light the performance area 102 (including the performer) and create various desired lighting effects. The supplemental lights 106 can be LED lights. Thus, the supplemental lights 106 can include the ability to project lighting levels of different intensities and project such light from different locations around the performance area 102. In some embodiments the supplemental lights 106 can be controlled during a performance in order to change the intensity of the lighting of performance area 102 (including the performer).

In some embodiments, the additional lighting elements can be created within one or more portions of the various displays 104 that create the virtual environment. For example, instead of depicting the virtual environment in a portion of one or more of the displays 104 surrounding the performance area 102, that portion of the display 104 can simulate a simulated light 108 that illuminates the performance area 102. Content production system can include multiple simulated lights 108 the location of each of which on the displays 104 can be selected in order to achieve a desired lighting effect. The selection and placement of simulated lights 108 can be made by a director, lighting technician or other user of immersive content production system 100 prior to a performance taking place within performance area 102 and being filmed by taking camera 112, but the number and location of the simulated lights 108 can be readily adjusted at any time during the performance.

Since each simulated light 108 is created by the displays 104 and are thus part of the displays 104, such simulated lights are sometimes referred to as "embedded lights" or "virtual lights". The simulated lights 108 can be in addition to or instead of the supplemental lights 106, such as supplemental lights 106. Thus, in some embodiments, immersive content production system 100 includes simulated lights 108 without any supplemental lights 106. Additionally, in some embodiments the taking camera(s) and/or the associated camera rigs capturing images of the performance area do not include any attached lights. For example, in some embodiments the taking camera 112 used to capture action within the performance area 102 does not include a ring of LED lights or other form of light for illuminating the performance area that might otherwise be used with such cameras.

In some embodiments, immersive content production system 100 can further include one or more depth sensors 120 and/or one or more motion capture cameras 122. During a performance performed within the performance area 102, immersive content production system 100 can detect the motion and/or positioning of one or more performers within the performance area. Such detection can be based on markers or sensors worn by a performer as well as by depth and/or other motion detection sensors 120 and/or by motion capture cameras 122. For example, an array of depth sensors 120 can be positioned in proximity to and directed at the performance area 102. For instance, the depth sensors 120 can surround the perimeter of the performance area. In some embodiments, the depth sensors 120 measure the depth of different parts of a performer in performance area 102 over the duration of a performance. The depth information can then be stored and used by the content production system to determine the positioning of the performer over the course of the performance.

Depth sensors 120 can include a motion-sensing input device with a depth sensor 120. The depth sensor 120 can include a monochrome complementary metal-oxide semiconductor (CMOS) sensor and infrared projector. The infrared projector can project infrared light throughout the performance area 102, and the CMOS sensor can measure the distance of each point of reflected infrared (IR) radiation in the performance area 102 by measuring a time it takes for the emitted infrared light to return to the CMOS sensor. Software in the depth sensors 120 can process the IR information received from the depth sensor 120 and use an artificial intelligence machine-learning algorithm to map the visual data and create three-dimensional (3-D) depth models of solid objects in the performance area 102. For example, the one or more depth sensors 120 can receive emitted infrared radiation to generate 3-D depth models of a performer, along with the floor, walls, and/or ceiling of the performance area 102. In one test embodiment, the performance area 102 was surrounded by six to eight Kinect® cameras to capture depth information of objects and performers in the performance area 102.

Motion cameras 122 can be part of a motion capture system that can track the movement of performers or objects within immersive content production system 100. In some instances, motion cameras 122 can be used to track the movement of the taking camera 112 and provide a location of the taking camera to immersive content production system 100 as part of the process that determines what portion of displays 104 are rendered from the tracked position of and the perspective of the taking camera.

Figure 2:
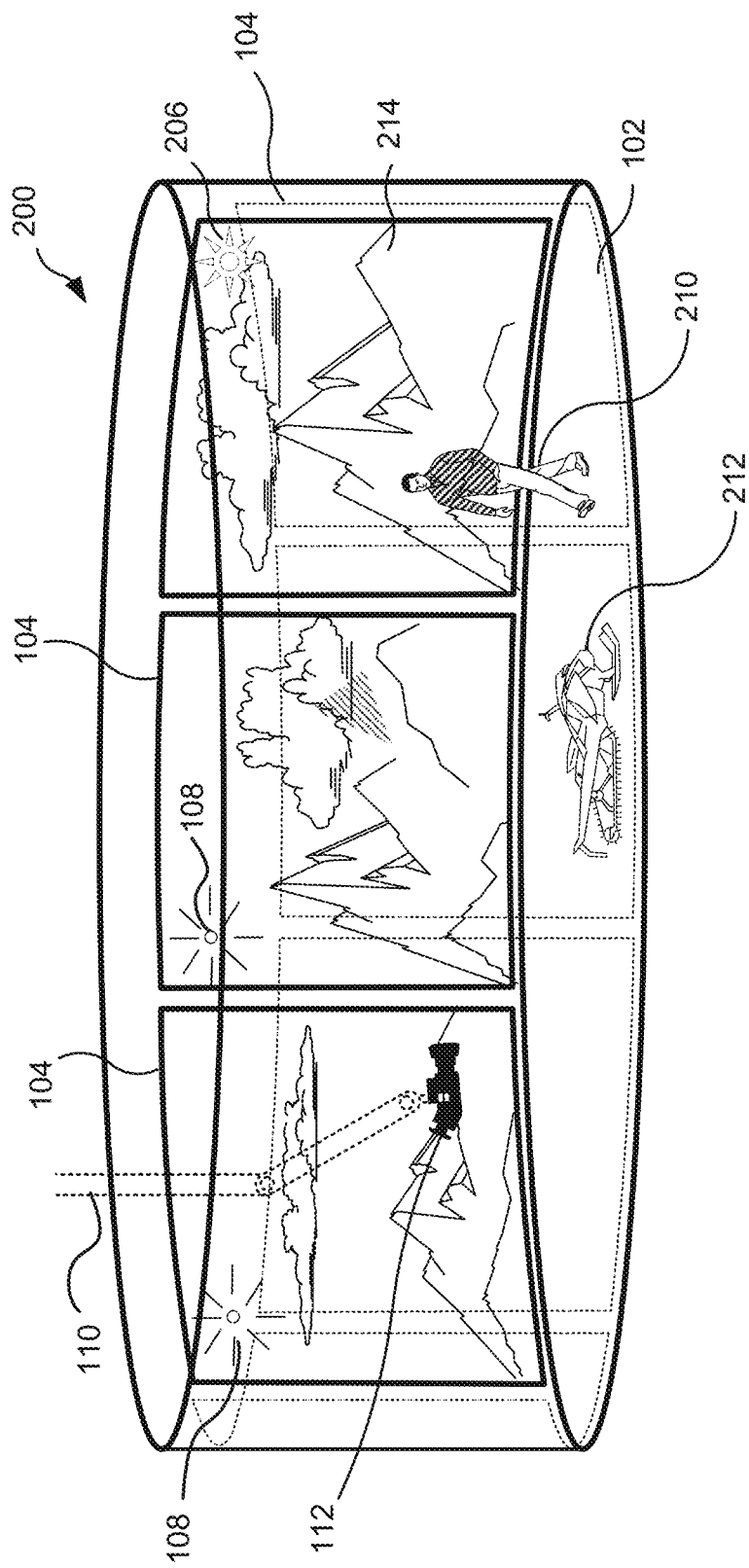
FIG. 2 illustrates an immersive content production system according to some embodiments of the invention with a performer on the stage and scenery depicted on the image displays.

FIG. 2 is a simplified illustration of an immersive content production system 200 according to an embodiment of the invention that can be similar or identical to immersive content production system 100 and thus includes many or all of the same components as described with respect to FIG. 1. As shown in FIG. 2, content production system 200 includes performance area 102, displays 104, simulated lights 108 and a taking camera 112 attached to rig 110, but does not include depth sensors 120 or motion cameras 122.

A performer 210 is also shown within performance area 102 and the performance area can include one or more props 212 (e.g., the snowmobile depicted in FIG. 2.). Scenery images 214 of the virtual environment can be presented on the displays 104 to generate the immersive environment in which performer 210 can conduct his or her performance (e.g., act out a scene in a movie being produced). In some embodiments, the scenery images 214 can be seamlessly presented across several displays 104 as described with respect to FIG. 1. Scenery images 214 can include one or more virtual light sources 206 that can be, for example, an image of a sun, a moon, stars, street lights, or other natural or manmade light sources displayed in the scenery images 214.

Scenery images 214 can also provide background for the video content captured by a taking camera 112 (e.g., a visible light camera). Taking camera 112 can capture a view of performance area 202 from a single perspective. In some embodiments, the taking camera 112 can be stationary, while in other embodiments, the taking camera 112 can be mounted to the moveable rig 110 that can move the taking camera during the performance.

Embodiments of the invention can generate and display perspective-correct images (as rendered from the tracked position and perspective of taking camera 112) onto portions of the surrounding image display walls that are within the field of view (i.e., the frustum) of the taking camera. Areas of the displays 104 outside the field of view of taking camera 112 can be displayed according to a global view perspective. Further details of associated with generating and displaying content on displays 104 according to two different perspectives in accordance with some embodiments of the invention are discussed below.

I. Color Correction

Figure 3:
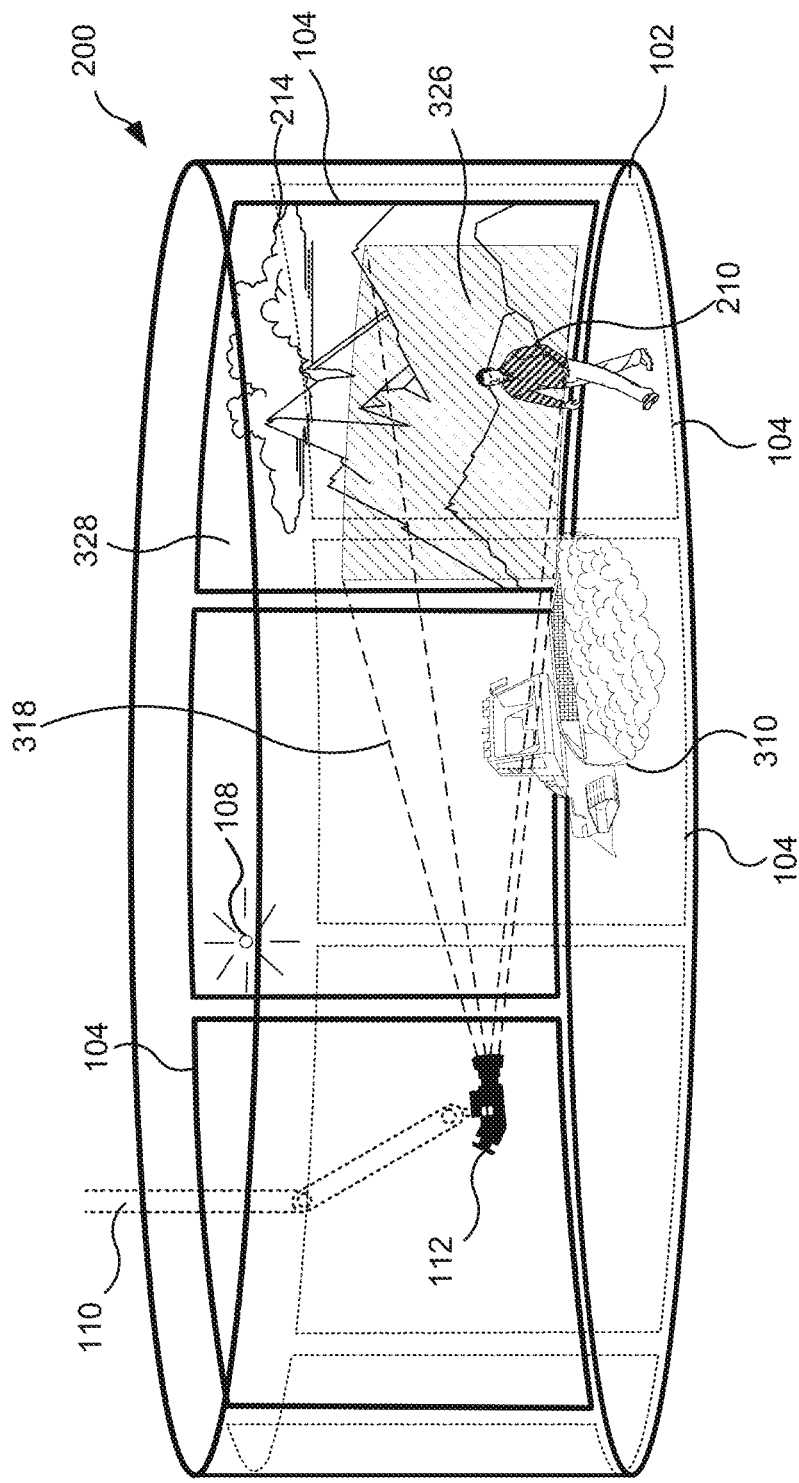
FIG. 3 illustrates an example of the frustum of a taking camera within the immersive content production system shown in FIG. 2.
Figure 4:
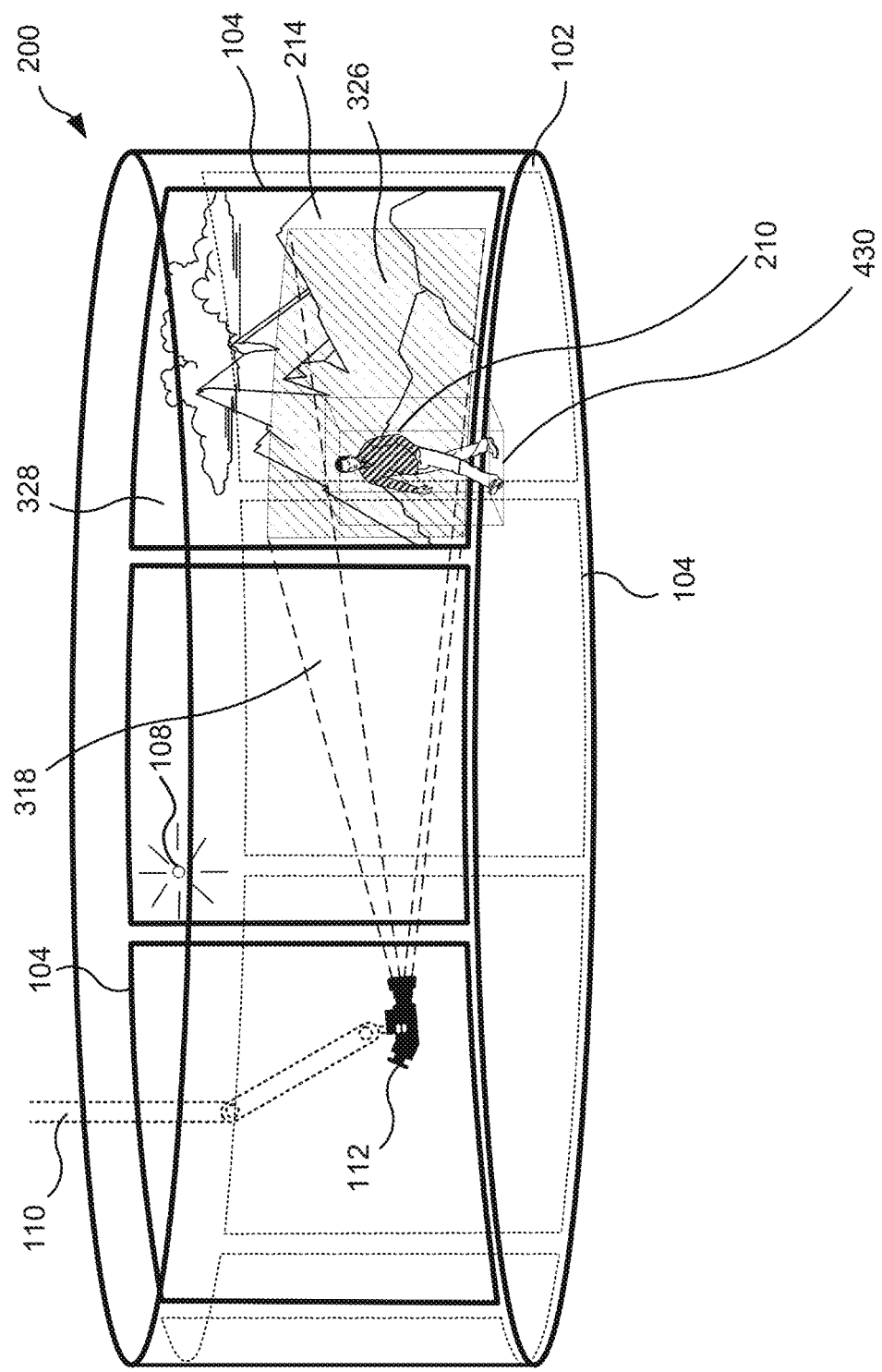
FIG. 4 illustrates an example of determining a volume of images within the frustum of the taking camera within the immersive content production system.

FIG. 3 is a simplified drawing of immersive environment production system 200 from FIG. 2. Shown in each of FIG. 3 and FIG. 4 is a frustum 318 of taking camera 112 within the content production system 200 that includes displays 104 that at least partially encircle a performance area 102 with a performer 210. Scenery images 214 can appear on the one or more displays 104. For three-dimensional (3D) graphics, the frustum of a camera, also known as a viewing frustum, can be the region of space in the modeled world that would appear on video taken from the taking camera 112. Thus, the frustum 318 is the field of view of the taking camera 112. The exact shape of viewing frustum 318 can vary and will depend on the lens of taking camera 112 but typically it is a frustum of a rectangular pyramid.

In creating the immersive environment presented on displays 104, immersive content production system 200 can render the portion within the frustum of the taking camera 112 differently than it renders the portion outside the frustum of the taking camera 112. For example, embodiments of the disclosure can render the portion 326 of the displays 104 that corresponds to frustum 318 as perspective-correct images that can update based on movement of the taking camera 112. For example, taking camera 112 can move during a performance as performer 210 moves or to capture the performer from a different angle. As the taking camera 112 moves, portions of the scenery images 214 within the viewing frustum 318 can be updated in accordance with the perspective of the camera. Portion 328 of the displays 104 outside of the frustum 318 can be rendered from a global view perspective and thus display relatively static images that do not change based on the movement of the taking camera 112.

In some embodiments, the images inside the frustum of the taking camera 112 can be at a higher resolution than the images outside the frustum. In some embodiments, the images displayed outside the frustum of the taking camera 112 can be relatively basic scenery images (e.g., blue sky, green grass, gray sea, or brown dirt.) In some instances the scenery images can be completely static. In other instances the scenery images 214 can dynamically change over time providing a more realistic background for the performance in the immersive content production system 200. For example, clouds can move slowly across the displays 104, branches of trees can blow in the wind, etc. to create realistic, life-like effects. Further, the scenery images 214 can dynamically change over time to represent changes in the environment over time.

In some instances, the colors of virtual objects (e.g., the performer 210 or snow cat 310) on a display 104 of the immersive cave or walls may not match or may become unsynchronized with the real world colors of the actors and physical objects within the performance area 102. For example, a performer 210 can be wearing a jacket that appears to be one color in the taking camera 112 and appears to be a different color or shade in the virtual environment. This could be a result of changing lighting patterns, light from the displays illuminating the actors, etc. As a result, content generated from images captured by the taking camera 112 may not appear realistic to viewers due to color discrepancies between the virtual and physical objects.

A set extension can provide an example of the color distortion for an immersive content generation system. For example, a set may have a checkerboard floor that extends into the display that portrays a bigger floor than the physical set. At some point the floor meets up against the LED wall. The LEDs on the wall will light up the real checkerboard floor. The lighting can result in a color mismatch unless the immersive content system is able to color correct the images in the display 104 to smooth out the seam between the physical floor and the virtual floor scenery images.

In order to have the colors of the displayed virtual objects, actors, and physical objects match visually, the content production system 200 may adjust the color of the virtual objects shown on the display in real-time (or at interactive frame rates) based on the color of the actors and physical objects in the earlier images (i.e., frames) of a given performance. In various embodiments, the technical supervisors and directors can view the images from the taking camera 112 via one or more monitors and detect the color mismatch.

More specifically, the content production system 200 may automatically or periodically receive input from a user to generate a set of three-dimensional (3D) volumes, such as volume 430. As shown in FIG. 4, the 3D volumes may surround one or more virtual objects (e.g., the performer 210) in a virtual environment to be displayed on the displays 104 of the content production system 200. In various embodiments, all virtual objects within the volumes can receive color correction as defined by the parameters of the volume. For example, the immersive content production system can take the exposure of the color in a defined volume 430 down by half a stop. In some embodiments, the content generation system 200 may present an input tool to enable the user to draw or otherwise define the boundaries of the volumes 430. In certain embodiments, the content generation system 200 may additionally or alternatively generate volumes 430 automatically. In some instances, the automatic generation of the volumes 430 may be based on the virtual position of the virtual objects within the virtual environment, tags or types associated with the virtual objects (e.g., all virtual objects with a certain tag may be contained within the same volume 430), an overall color or some other attribute of the virtual objects, etc. The technique of identifying the specific volumes that need correction saves computational power because the system does not need to determine what areas of the screen may have over lapping pixels and requiring the screen to be rendered multiple times to apply a color correction.

In an example, if a performer is standing in the middle of the performance area surrounded by displays showing a virtual world with Greek columns around the performer (e.g., 12 columns surrounding the performer). Each one of the columns can have a color correction capsule volume fully enclosing just that one column. The immersive content system could be running 12 different color corrections operations. Using a brute force method, the system could render the whole screen the entire circle of LEDs 12 times over to account for all 12 of those color correction volumes. Using the techniques disclosed herein, the display area can be segmented up into multiple grid zones with each of the columns occupying a number of grids (e.g., three zones wide by ten zones tall). Whenever the system renders one of those grid zones, the system need only apply the color corrections for volumes that are occupied as grid zones. So now the system can apply all 12 of those color corrections in parallel.

This process of color correction can be done in near real-time, with the color correction process being completed in a few milliseconds.

Figure 5:
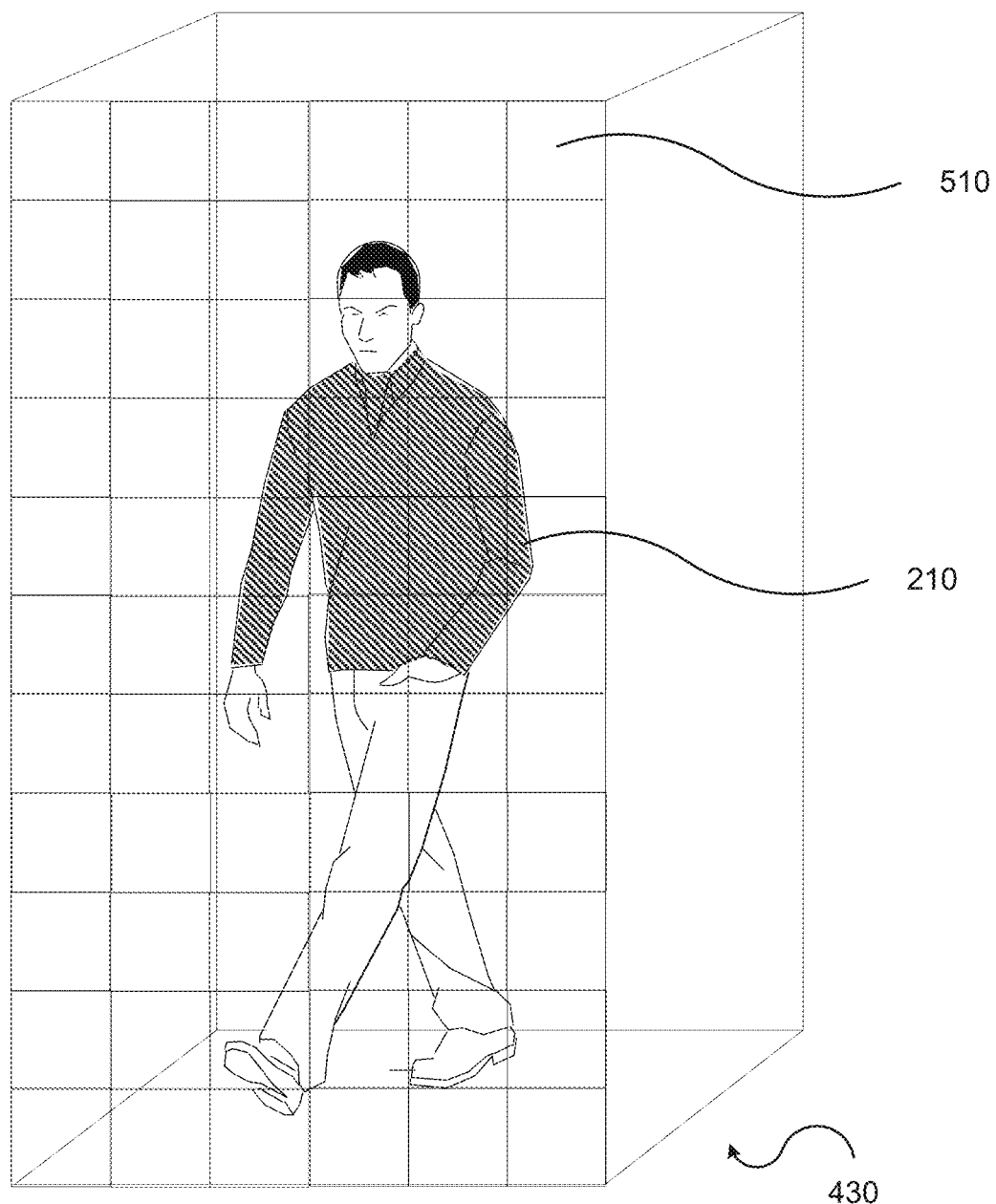
FIG. 5 illustrates an example of a two-dimensional tiling technique for a volume of an image.

During a performance, the content production system may perform a tiled, deferred color correction pass that handles multiple individual 3D color correction volumes simultaneously, bins the volumes into two-dimensional (2D) tiles in screen space, and then processes the affected pixels in each tile in order according to a per-volume priority factor. For example, FIG. 5 illustrates a volume 430 around a performer 210. The volume 430 can be divided into a plurality of tiles 510. For example, for an 8K LED wall that is 30 feet wide at 1.22 mm pixel pitch can have 7680 pixels by 4320 pixels. Using 64 pixel by 64 pixels, that would produce 120 by 68 tiles. The tiles 510 are not drawn to scale and are used for demonstrative purpose. In various embodiments, the tiles can be 64 pixels by 64 pixels. The tiles 510 may be used to determine areas in which the color correction needs to be applied. For example, the director may indicate that the color of the jacket for the performer 210 needs to be corrected due to a lighting artifact. The tiles 510 containing the jacket may be identified by the user and only the pixels contained within the identified tiles 510 that include the jacket may have the color correction applied, therefore leaving the rest of the virtual image of the performer 210 unaffected.

In some embodiments, color correction may be performed by determining one or more color error values or mismatch values between a physical reference target (e.g., a performer 210) in the performance area 102 and a given virtual object. The content production system 200 may iteratively or progressively modify color related attributes for the virtual object until the color error values or mismatch values meet one or more threshold color correction values. As a simple example, the threshold color correction value for a color green may be set at a value of 1. The content production system may continuously color correct the green color for a virtual object until the virtual object's mismatch value is below 1. The iterative process can be a differential render where the color of the selected tiles are compared to a desired color. When the mismatch is above a predetermined threshold, the color is adjusted on the selected tiles until the comparisons are within the predetermined threshold. In various embodiments, a user provides a second input to manual adjust the colors for the selected tiles. In various embodiments, the system detects the colors of the selected tiles and compares the detected colors with a color for the physical object.

Figure 6:
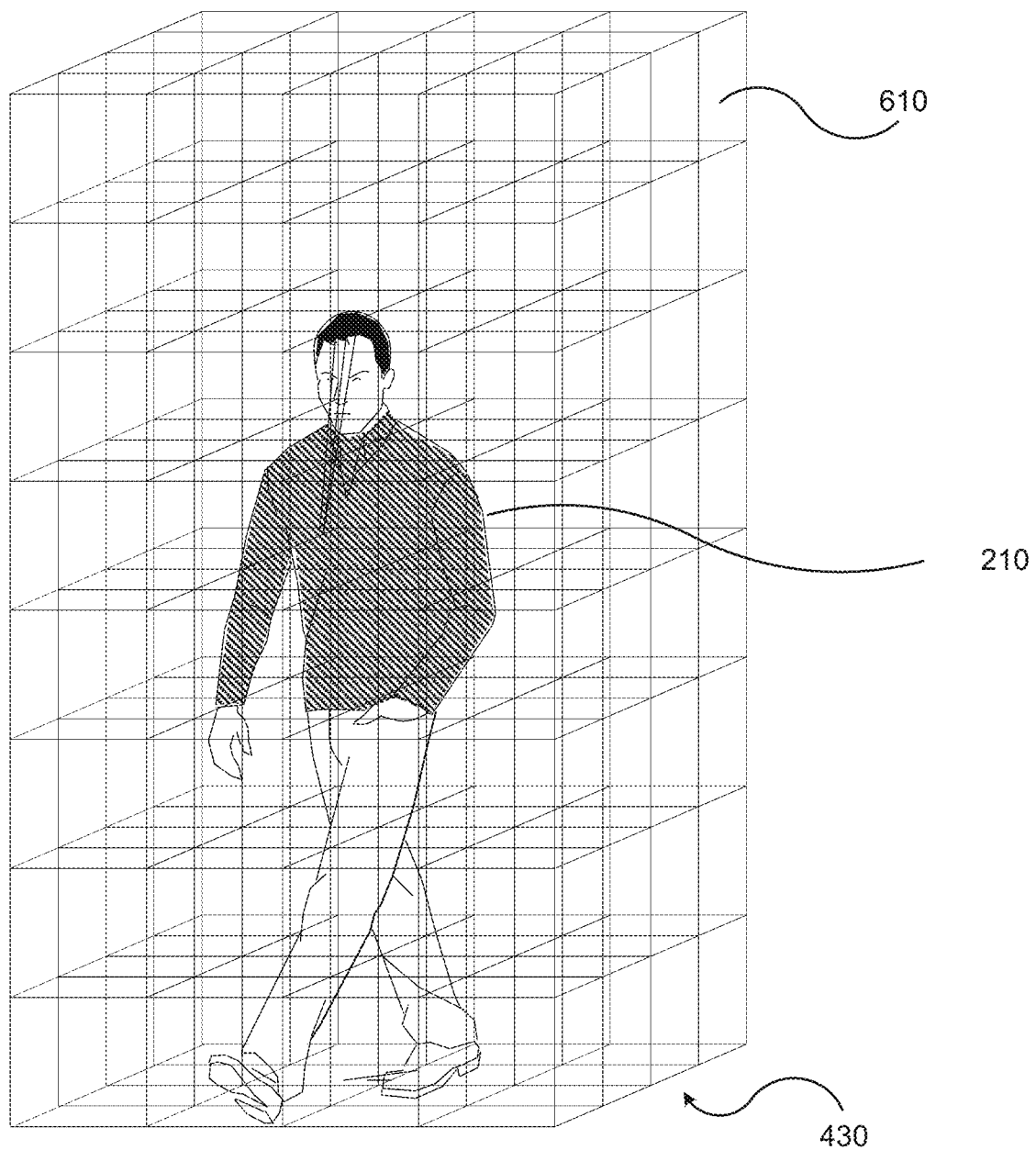
FIG. 6 illustrates an example of a three-dimensional volume technique for an object in an image.

FIG. 6 illustrates an example of a three-dimensional volume technique for an object in an image. FIG. 6 illustrates breaking up the volume 430 into multiple, sub-volumes 610 instead of the tiles 510 shown in FIG. 5. Using the same example as described above, the director may indicate that the color of the jacket for the performer 210 needs to be corrected due to a lighting artifact. In this case, the sub-volumes 610 containing the jacket may be identified by the user and only the identified sub-volumes 610 that include the jacket may have the color correction applied, therefore leaving the rest of the virtual image of the performer 210 unaffected.

In various embodiments, there may be insufficient processing power to make all the color corrections required and thus the corrections can be prioritized. In these cases, the lower priority corrections may not be made.

In some embodiments, the per-volume priority factor for each volume may be assigned via user input. In other embodiments, the per-volume priority factor may be based on one or more criteria or heuristics. For example, the content production system may assign higher per-volume priorities for volumes that take up a larger portion of a given image frame. As another example, the content production system may assign higher per-volume priorities to volumes that contain virtual objects that are moving at least a threshold velocity or that are moving faster relative to other virtual objects. As yet another example, the content production system may assign higher per-volume priorities to volumes that contain virtual objects of certain shapes. For instance, volumes with virtual objects containing humans (e.g., background characters) may be assigned higher per-volume priorities. As yet another example, the content protection system may assign higher per-volume priorities to volumes that are virtually closer to the taking camera. The content production system may determine the closeness of a virtual object based on the virtual depth of the object. As still another example, the content production system may be trained using previously assigned priority factors for various volume shapes and/or virtual object shapes. Based on the training, the content production system may automatically assign per-volume priority factors for volumes in a given performance.

Figure 7:
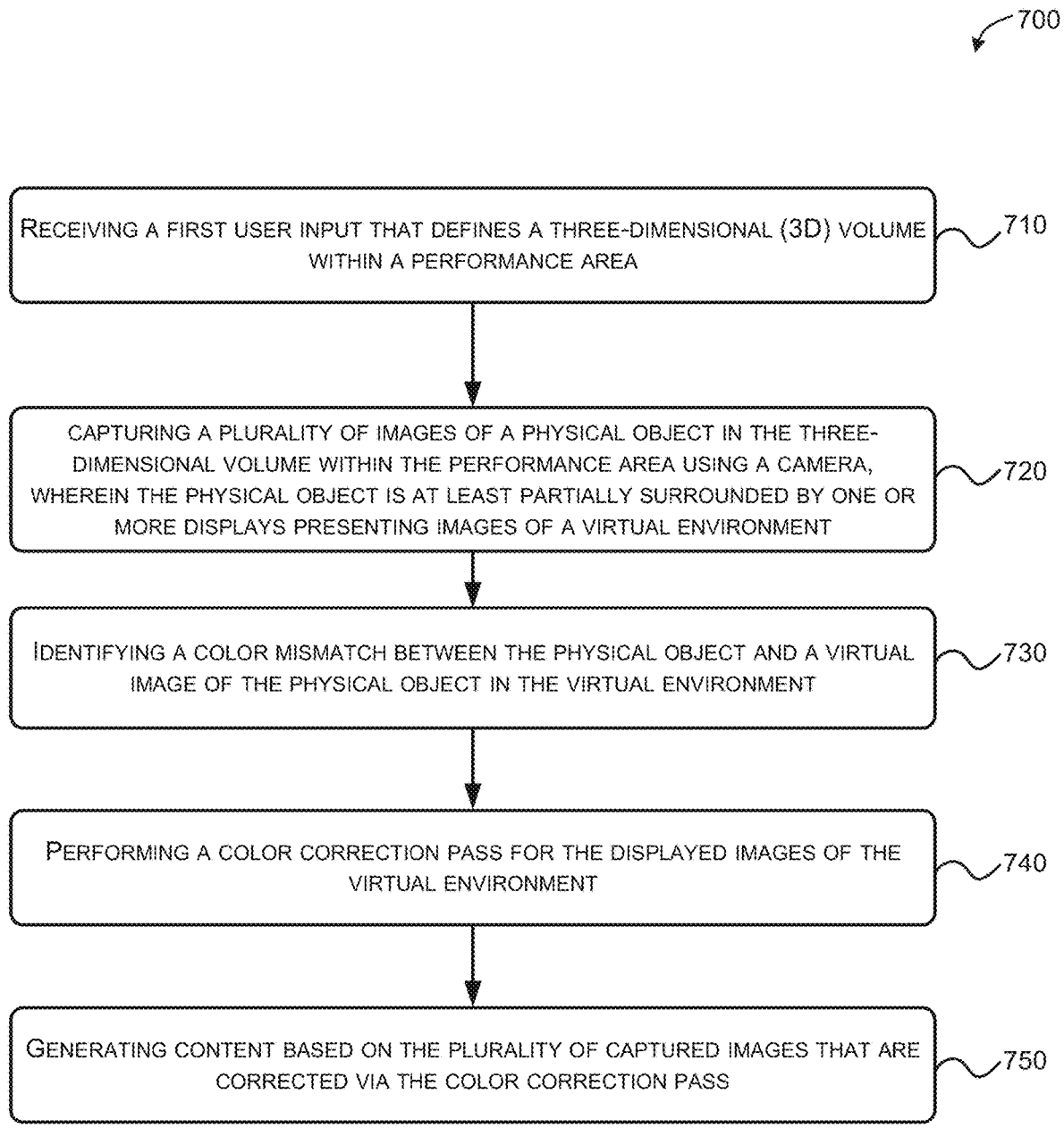
FIG. 7 illustrates an exemplary flowchart for a process for color correction using an immersive content generation system.

FIG. 7 is a flow chart of an example process 700 for color correction for immersive content production systems. In some implementations, one or more process blocks of FIG. 7 can be performed by an immersive content production system. In some implementations, one or more process blocks of FIG. 7 can be performed by another device or a group of devices separate from or including the immersive content production system.

Figure 13:
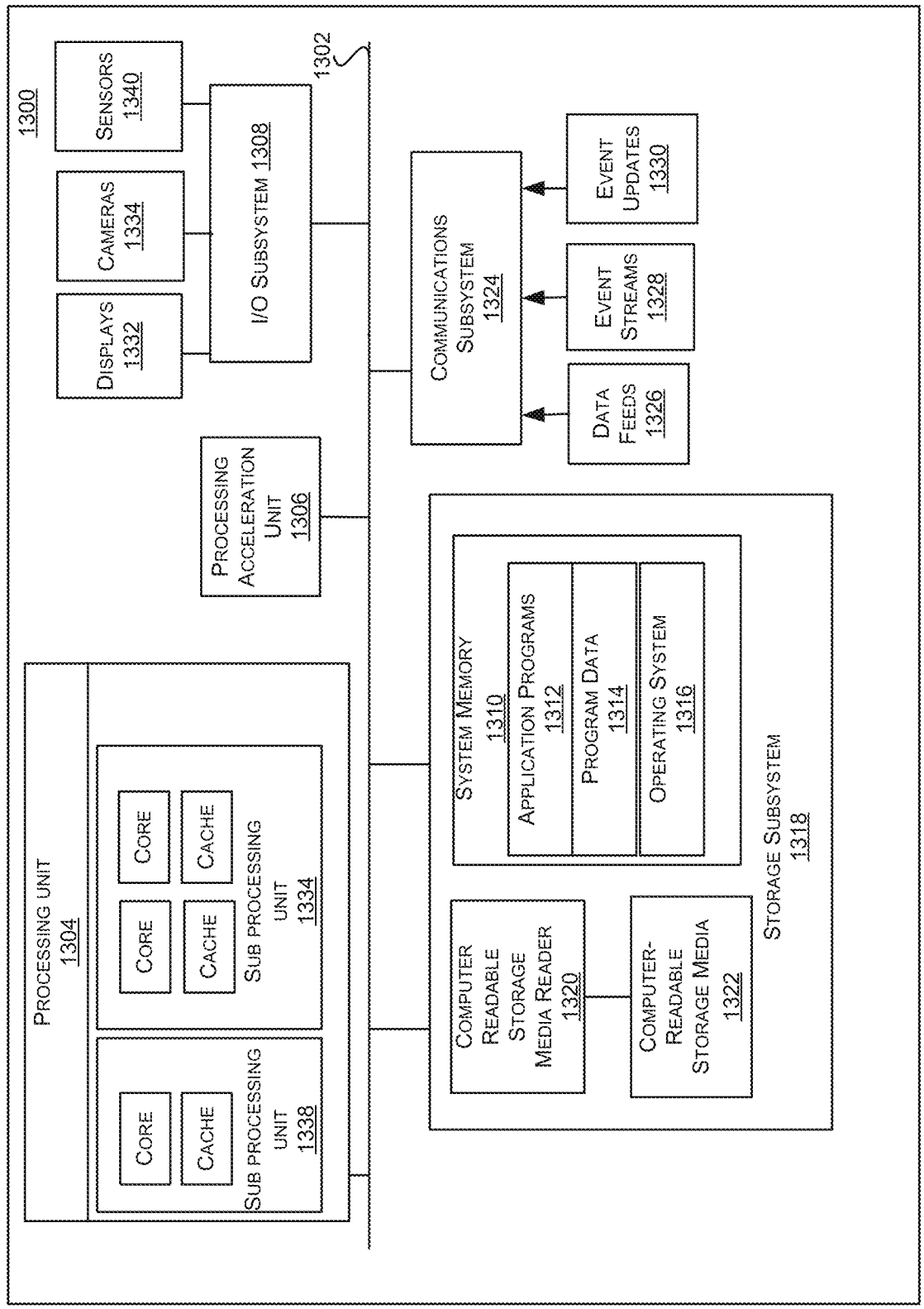
FIG. 13 illustrates a simplified block diagram of an immersive content production system.

At 710, process 700 can include receiving a first user input that defines a three-dimensional (3D) volume within a performance area. For example, the immersive content production system (e.g., using processing unit 1304, system memory 1310, storage subsystem 1318, input/output subsystem 1308, and/or the like as illustrated in FIG. 13 and described below) can receive a first user input that defines a three-dimensional (3D) volume within a performance area, as described above. In various embodiments, a user may use an input device (e.g., a mouse, a trackball, a keyboard, a touchscreen, or a pointing device) connected to the system to identify the volume within the performance area that needs color correction.

At 720, process 700 can include capturing a plurality of images of a physical object in the three-dimensional volume within the performance area using a camera, wherein the physical object is at least partially surrounded by one or more displays presenting images of a virtual environment. For example, the immersive content production system (e.g., using processing unit 1304, system memory 1310, storage subsystem 1318, input/output subsystem 1308, cameras 1334, displays 1332 and/or the like as illustrated in FIG. 13 and described below) can capture a plurality of images of an object in the performance area using a camera, as described above. The camera capturing the images is the taking camera. In some implementations, the object is at least partially surrounded by one or more displays presenting images of a virtual environment. The taking camera captures images of physical objects and virtual images displayed.

At 730, process 700 can identifying a color mismatch between the physical object and a virtual image of the physical object in the virtual environment. The color mismatch can be identified for the portion of the images that are within the three-dimensional volume defined by the user. For example, the immersive content production system (e.g., using processing unit 1304, system memory 1310, storage subsystem 1318, input/output subsystem 1308, and/or the like as illustrated in FIG. 13 and described below) can identify the color mismatch between the physical object and the virtual image of the physical object in the virtual environment. In various embodiments, a user can identify the color mismatch via virtual observation. In some embodiments, the color mismatch can be automatically identified.

At 740, process 700 can performing a color correction pass for images of the virtual environment. The color correction can be performed for the portion of the images that are within the three-dimensional volume defined by the user. For example, the immersive content production system (e.g., using processing unit 1304, system memory 1310, storage subsystem 1318, input/output subsystem 1308, and/or the like as illustrated in FIG. 13 and described below) can perform a color correction pass for images of the virtual environment. The color correction pass can adjust the color value of the pixels within the identified volume based in part on the second user input. In various embodiments, the process 700 can automatically determine the color correction required.

In some embodiments, the process 700 can include receiving a second user input to adjust a color value of the virtual image of the physical object as displayed in the images in the virtual environment. For example, the immersive content production system (e.g., using processing unit 1304, system memory 1310, storage subsystem 1318, input/output subsystem 1308, and/or the like as illustrated in FIG. 13 and described below) can receive a second user input to adjust a color value of a virtual image of the object as displayed in the images in the virtual environment, as described above. In various embodiments, the user may use an input device (e.g., a mouse, a trackball, a keyboard, a touchscreen, one or more dials, a slider, or a pointing device) connected to the system to adjust the color value of the virtual image of the object as displayed in the images of the virtual environment.

In various embodiments, the color correction pass can include defining a plurality of individual three-dimensional color correction volumes for the virtual image of the physical object. The color correction pass can include binning the plurality of individual three-dimensional color correction volumes into two-dimensional tiles in a screen space. The color correction pass can include identifying the two-dimensional tiles encompassing a portion of the three-dimensional color volume with the color mismatch. The color correction pass can include identifying pixels associated with the identified tiles. The color correction pass can include adjusting a color value for the identified pixels until the color mismatch is below a threshold. In various embodiments, the color mismatch value can be determined by eyes from color experts, artists, and visual effects supervisors.

At 750, process 700 can include generating content based on the plurality of captured images that are corrected via the color correction pass. For example, the immersive content production system (e.g., using processing unit 1304, system memory 1310, storage subsystem 1318, input/output subsystem 1308, displays 1332 and/or the like as illustrated in FIG. 13 and described below) can generate content based on the plurality of captured images that are corrected via the color correction pass, as described above. The content can be motion picture content, television content, or other video productions. The images displayed on the LED displays can be updated for the adjusted color value.

Process 700 can include additional implementations, such as any single implementation or any combination of implementations described below and/or in connection with one or more other processes described elsewhere herein. It should be appreciated that the specific steps illustrated in FIG. 7 provides particular techniques for color correction for immersive content production systems according to various embodiments of the present disclosure. The techniques for color correction can be performed in parallel with corrections for motion blur and depth of field. Other sequences of steps can also be performed according to alternative embodiments.

For example, alternative embodiments of the present disclosure can perform the steps outlined above in a different order. Moreover, the individual steps illustrated in FIG. 7 can include multiple sub-steps that can be performed in various sequences as appropriate to the individual step. Furthermore, additional steps can be added or removed depending on the particular applications. One of ordinary skill in the art would recognize many variations, modifications, and alternatives.

In some implementations, process 700 includes generating the plurality of individual three-dimensional color correction volumes based at least in part on a position of a virtual object within the virtual environment, one or more tags associated with the virtual object, and an overall color of the virtual object.

In some implementations, the color correction pass includes determining one or more color error values between a physical reference target in the performance area and the virtual object.

In some implementations, process 700 includes iteratively modifying the color value for the virtual object using standard video processing techniques until the one or more color error values meet one or more threshold color correction values.

In some implementations, process 700 includes determining an overall volume priority value from each tile by performing a calculation based on one or more per-volume priority factors of the plurality of individual three-dimensional color correction volumes binned into the tile.

In some implementations, process 700 includes modifying the color values according to the determined overall volume priority, wherein the modifying the color values from a highest priority to a lowest priority.

In some implementations, process 700 includes determining one or more off-screen tiles based at least in part on a camera position, a camera orientation, and one or more camera settings.

In some implementations, process 700 includes determining a plurality of individual three-dimensional color correction volumes simultaneously; binning the plurality of individual three-dimensional color correction volumes into three-dimensional space in a screen space; and processing a plurality of affected pixels in each individual volumes of the three-dimensional space.

In some implementations, process 700 includes receiving a user input assigning a per-volume priority factor for each volume. In various embodiments, the user may use an input device (e.g., a mouse, a trackball, a keyboard, a touchscreen, or a pointing device) connected to the system to assign a per-volume priority factor for each volume.

In some implementations, process 700 includes automatically assigned a per-volume priority factor for each volume based on one or more criteria. The one or more criteria can include a percentage of the total viewing area for the identified volume, the amount of color correction needed for the identified volume, the depth of the area needing correction, and other similar considerations.

Although FIG. 7 shows example steps of process 700, in some implementations, process 700 can include additional steps, fewer steps, different steps, or differently arranged steps than those depicted in FIG. 7. Additionally, or alternatively, two or more of the steps of process 700 can be performed in parallel.

II. Motion Blur

Motion blur is a technique in content production that gives the appearance of motion to a stationary object. For example, a physical vehicle may be in a performance area of an immersive content generation system. The vehicle can be stationary but the images displayed in the background may give the appearance that the vehicle is traveling at highway speed (e.g., 60 miles per hour). A taking camera 112 can capture images of the vehicle and the images of the virtual environment in a background of the vehicle. However, the taking camera can be moving around the vehicle. The motion of the camera can distort the images of the background as the taking camera 112 moves around the vehicle. Therefore, the virtual images need to be adjusted to account for the motion blur caused by the motion of the taking camera 112.

In some embodiments, the content production system may generate adjusted motion blur for the virtual objects shown on the displays of the system in response to movement of the taking camera and/or a stage in a performance area. More specifically, the content production system may determine velocity, acceleration, angle, orientation, and/or other movement related data for the taking camera and/or a stage within the performance area. Based on this information, the distance information of the physical objects from the taking camera, and the virtual distance information of the virtual objects from the taking camera, the content production system may determine an amount of motion blur to be applied to the virtual objects in the virtual environment. More specifically, the content production system may determine the amount of motion blur exhibited by images of the physical objects in the performance area. The content production system may thereafter apply a similar amount of motion blur to the virtual objects shown on the display. In some embodiments, the content production system may apply a smaller amount of motion blur to the virtual objects relative to the amount of motion blur seen in the physical objects. In particular, the displays presenting the virtual objects may exhibit some motion blur themselves as the displays are also physical objects. As such, the content production system may apply an amount of motion blur equal to the difference between the amount of motion blur attributed to the physical objects in the performance area and the displays of the content production system. In this way, the virtual objects may exhibit an appropriate amount of motion blur in comparison to the physical objects within the performance area.

Figure 8:
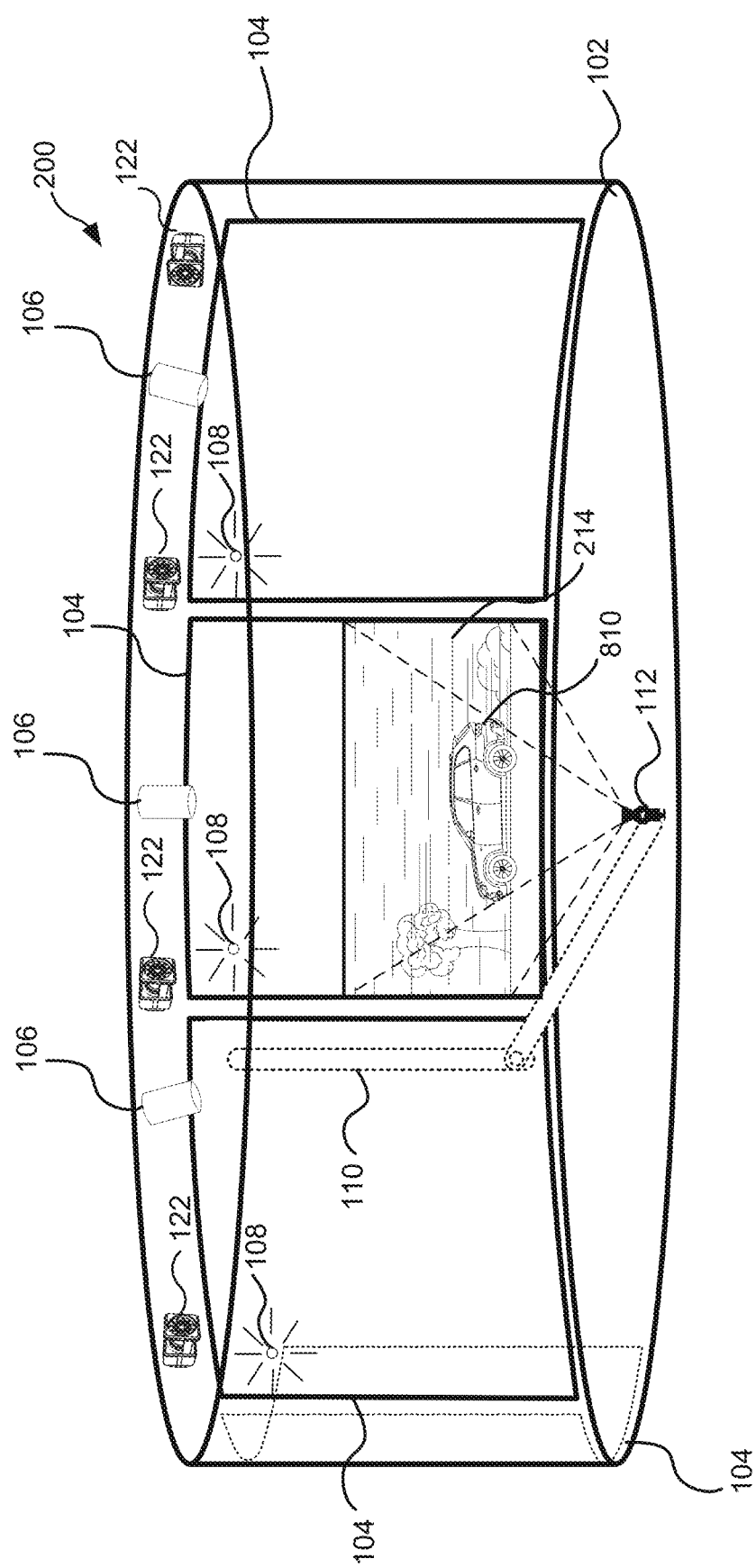
FIG. 8 illustrates an exemplary immersive content system for determining motion blur of associated with a moving image.

FIG. 8 illustrates an exemplary immersive content system for determining motion blur of associated with a moving image. FIG. 8 is a simplified drawing of immersive environment production system 200 from FIG. 2. FIG. 8 illustrates a vehicle 810 being captured by a taking camera 112 on a moveable rig 110 within the content production system 200 that includes displays 104 that at least partially encircle a performance area 102. Scenery images 214 can appear on the one or more displays 104. The immersive cave or walls can include supplemental lights 106 separate from displays 104 that can light the performance area 102 (including the performer) and create various desired lighting effects. The supplemental lights 106 can be LED lights. The content production system 200 can include multiple simulated lights 108 the location of each of which on the displays 104 can be selected in order to achieve a desired lighting effect.

The immersive content production system 100 can further include one or more motion capture cameras 122. The motion capture cameras 122 can determine the motion of the taking camera 112. In various embodiments, one or more sensors can be attached to the taking camera 112 or the moveable rig 110.

In other embodiments, the taking camera 112 or the rig 110 can include one or more position sensors, or motion sensors (e.g., one or more accelerometers and/or gyroscopes) to determine one or more of a position, an orientation, and a motion of the taking camera 112 as the taking camera 112 moves around the performance area 102 during film. Scenery images 214 can also provide background for the video content captured by a taking camera 112. Motion blur can be applied to the scenery images 214 to provide an appearance of motion for a stationary vehicle 810 on the set. As the taking camera 112 moves, the motion blur in the scenery images 214 can be adjusted to account for the motion and orientation of the taking camera 112.

Figure 9:
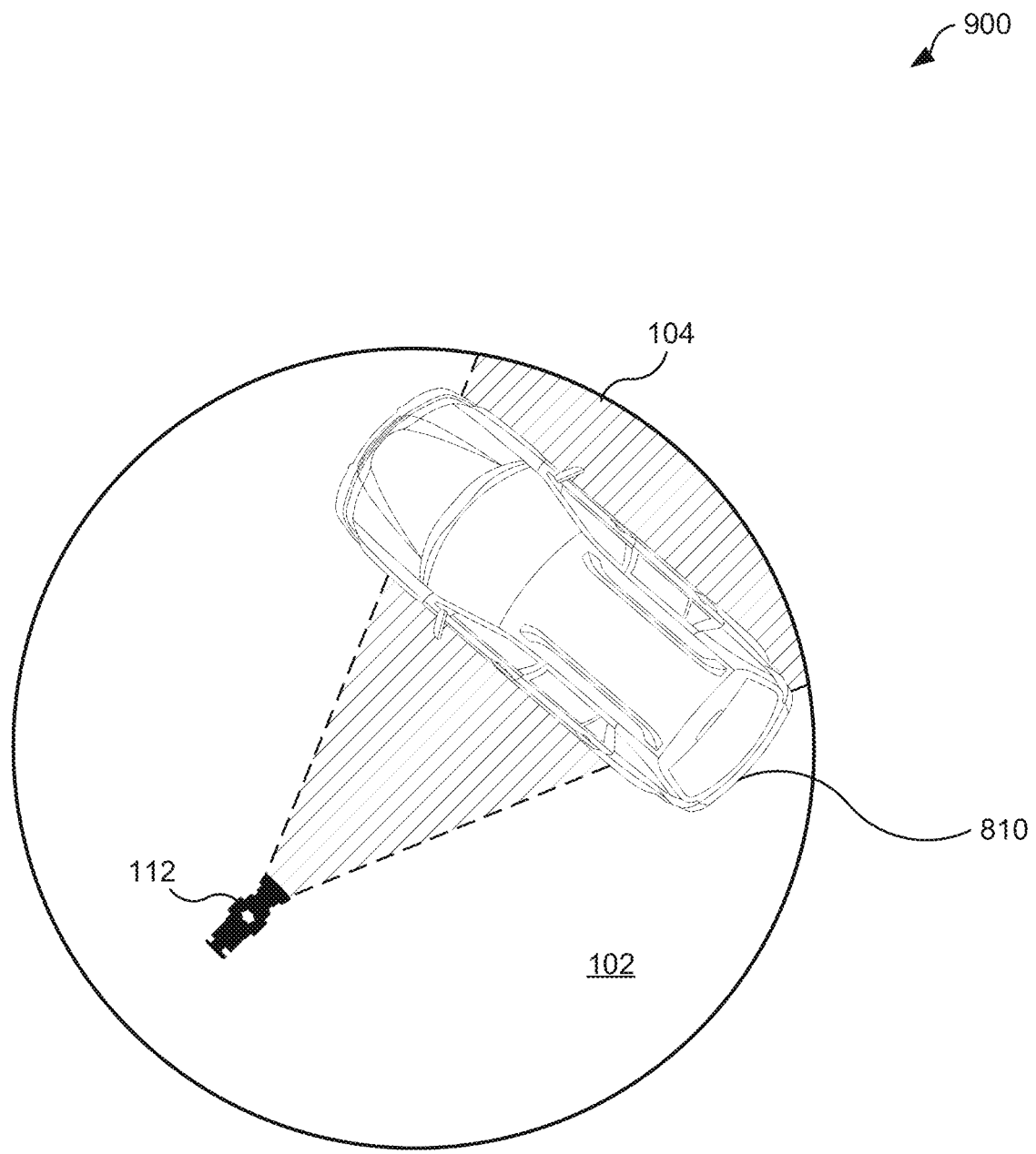
FIG. 9 illustrates an overhead view for determining motion blur using an immersive content generation system.

FIG. 9 illustrates an overhead view 900 of a performance area 102 for determining motion blur using an immersive content generation system. Scenery images 214 (not shown) can be displayed on one or more displays 104 behind a vehicle 810 in a performance area 102. The taking camera 112 can capture one or more images through a window (e.g., a side window, a back window, a rear window, or a windshield) of the vehicle 810. The scenery images 214 displayed around the vehicle 810 can provide the perception of motion, also known as motion blur, as captured through the lens of the taking camera 112. However, this motion blur can be distorted due to the motion of the taking camera 112 as it moves around the performance area 102.

Figure 10:
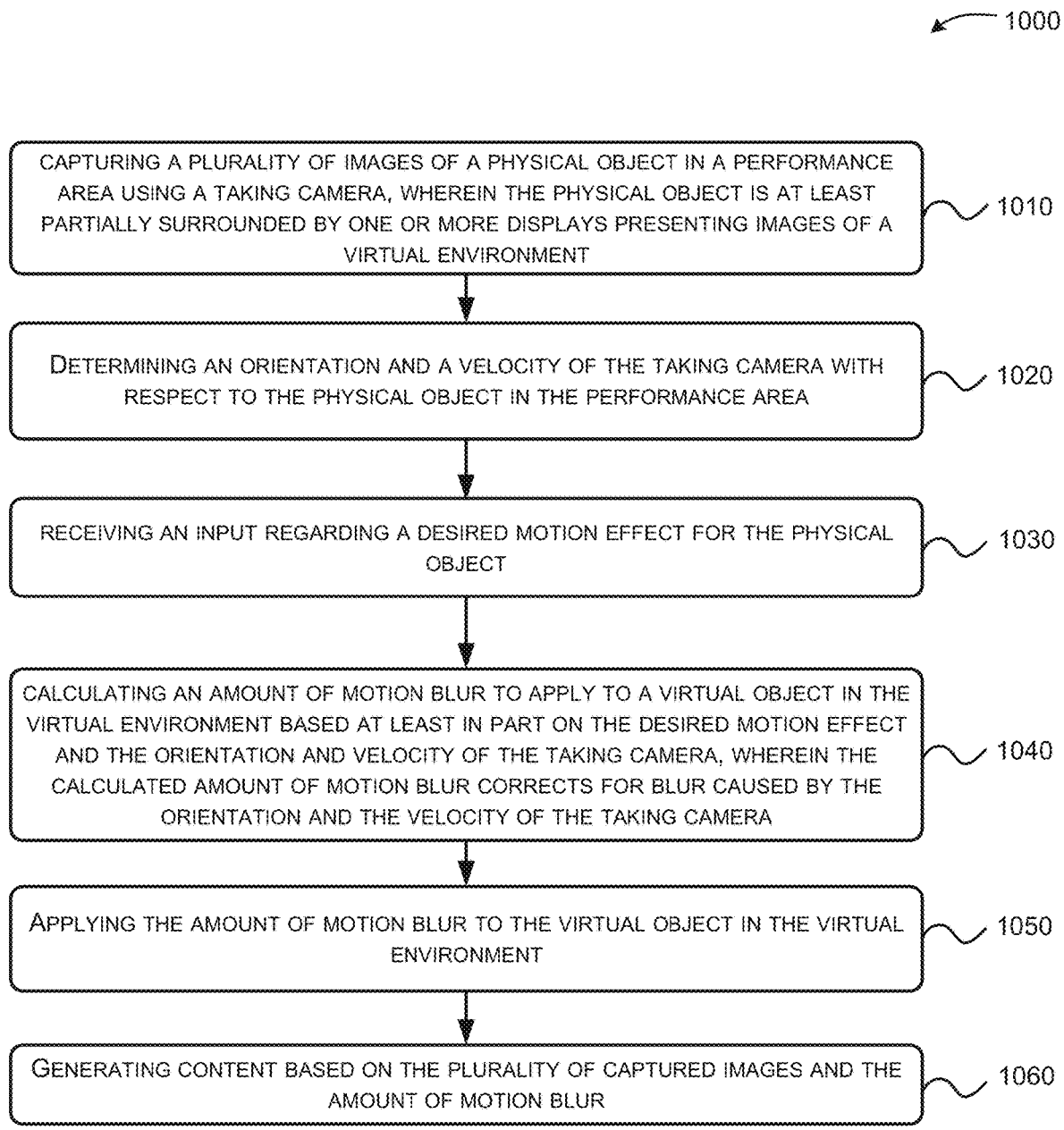
FIG. 10 illustrates an exemplary flowchart for a process for motion blur using an immersive content generation system.

The techniques disclosed herein will apply a correction to the motion blur as it appears on the display 104. In this way, the motion blur can appear correct through the lens of the taking camera 112 even as the taking camera 112 moves. The immersive content generation system 200 can determine the amount of motion blur to apply and apply the motion blur FIG. 10 is a flow chart of an example process 1000 for motion blur correction. In some implementations, one or more process blocks of FIG. 10 can be performed by an immersive content generation system. In some implementations, one or more process blocks of FIG. 10 can be performed by another device or a group of devices separate from or including the immersive content generation system.

At 1010, process 1000 can include capturing a plurality of images of a physical object in a performance area using a taking camera, wherein the physical object is at least partially surrounded by one or more displays presenting images of a virtual environment. For example, the immersive content generation system (e.g., using a processing unit 1304, a system memory 1310, one or more displays 1332, a storage subsystem 1318, one or more cameras 1334, and/or the like as illustrated in FIG. 13 and described below) can capture a plurality of images of a physical object in a performance area using a taking camera, as described above. In some implementations, the physical object is at least partially surrounded by one or more displays presenting images of a virtual environment.

At 1020, process 1000 can include determining an orientation and a velocity of the taking camera with respect to the physical object in the performance area. For example, the immersive content generation system (e.g., using a processing unit 1304, a system memory 1310, storage subsystem 1318, input/output subsystem 1308, sensors 1340, application programs 1312 and/or the like as illustrated in FIG. 13 and described below) can determine an orientation and a velocity of the taking camera with respect to the physical object in the performance area, as described above. One or more motion capture cameras, motion sensors, accelerometers, gyroscopes can be used to determine a position, motion, and orientation of the taking camera 112. The system can use the location of the taking camera 112 over time to determine the velocity. In various embodiments, reflective sensors can be affixed to the taking camera 112 or the moveable rig 110.

At 1030, process 1000 can include receiving an input regarding a desired motion effect for the physical. For example, the immersive content generation system (e.g., using a processing unit 1304, a system memory 1310, a storage subsystem 1318, an input/output subsystem 1308, one or more application programs 1312 and/or the like as illustrated in FIG. 13 and described below) can receive an input regarding a desired motion effect for the physical object. For example, if the virtual object is a vehicle and the desired effect is to have the vehicle traveling at highway speeds (e.g., 60 miles per hour) a user (e.g., a special effects technician) can use the input/output system 1308 to selected the desired speed effect to provide an appearance that the vehicle is traveling at highway speeds.

At 1040, process 1000 can include calculating an amount of motion blur to apply to a virtual object in the virtual environment based at least in part on the desired motion effect and the orientation and velocity of the taking camera, wherein the calculated amount of motion blur corrects for blur caused by the orientation and the velocity of the taking. For example, the immersive content generation system (e.g., using a processing unit 1304, a system memory 1310, a storage subsystem 1318, an input/output subsystem 1308, one or more application programs 1312 and/or the like as illustrated in FIG. 13 and described below) can calculate an amount of motion blur to apply to a virtual object in the virtual environment based at least in part on the desired motion effect and the orientation and velocity of the taking camera, wherein the calculated amount of motion blur corrects for blur caused by the orientation and the velocity of the taking camera. As the taking camera 112 moves around the performance area, it can capture the motion displayed on the LED displays 104. The system can use the geometries of the orientation and velocity of the taking camera calculate an amount of motion blur to apply to the virtual images.

In computer graphics, outside the context of an immersive content system, motion blur can be calculated as the movement of virtual objects relative to the camera, e.g., the pixels of the moving car move 10 pixels to the left in the image that the camera takes between one frame to the next. That calculation depends on both the virtual car's movement in that time, and also the camera movement (position change, rotation change, focal length change etc.) during the same time.

In an immersive content system such as the LED wall, it is undesirable to include the physical movement of the camera relative to the stage in the motion blur calculation because the taking camera itself will do the motion blurring as it pans over the LED screen (that mainly takes into account the rotation change of the camera, a position change of the camera cannot be compensated that way). To achieve this, the immersive content system can run the same calculations that would normally be used for motion blur, just instead of using the camera's position and orientation in the virtual world, the immersive content system can use the stage's position and orientation in the virtual world. This allows the immersive content system to move the stage around in the virtual world (e.g., pretending that the camera is attached to a car driving through that world), and getting all the motion blurring from that virtual movement, without getting the blur caused by the physical movement of the camera on stage.

At 1050, process 1000 can include applying the calculated amount of motion blur to the virtual object in the virtual environment. For example, the immersive content generation system (e.g., using a processing unit 1304, a system memory 1310, a storage subsystem 1318, an input/output subsystem 1308, one or more application programs 1312, one or more displays 1332 and/or the like as illustrated in FIG. 13 and described below) can apply the calculated amount of motion blur to the virtual object in the virtual environment, as described above. By applying the calculated amount of motion blur, the first amount of motion blur can be adjusted by removing the effects of the motion of the taking camera 112.

At 1060, process 1000 can include generating content based on the plurality of captured images and the amount of motion blur. For example, the immersive content generation system (e.g., a using processing unit 1304, a system memory 1310, a storage subsystem 1318, an input/output subsystem 1308, one or more displays 1332, one or more cameras 1334 and/or the like as illustrated in FIG. 13 and described below) can generate content based on the plurality of captured images and the amount of motion blur, as described above.

Process 1000 can include additional implementations, such as any single implementation or any combination of implementations described below and/or in connection with one or more other processes described elsewhere herein. It should be appreciated that the specific steps illustrated in FIG. 10 provide particular techniques for title according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 10 can include multiple sub-steps that can be performed in various sequences as appropriate to the individual step. Furthermore, additional steps can be added or removed depending on the particular applications. One of ordinary skill in the art would recognize many variations, modifications, and alternatives.

In some implementations, the first distance and the second distance are determined by a second camera that follows the taking camera. In some implementations, the first distance and the second distance are determined by one or more depth sensors in the performance area.

In some implementations, process 1000 includes generating a third amount of motion blur for the displays, wherein the third amount of motion blur is being determined for the one or more displays in the performance area, wherein the motion blur is being calculated as a different in motion blur applied to physical objects in the performance area and the orientation and the velocity of the taking camera; and applying the third amount of motion blur to the one or more displays.

Although FIG. 10 shows example steps of process 1000, in some implementations, process 1000 can include additional steps, fewer steps, different steps, or differently arranged steps than those depicted in FIG. 10. Additionally, or alternatively, two or more of the steps of process 1000 can be performed in parallel.

III. Depth of Field (DOF)

Depth of field (DOF) is the distance between the closest and farthest objects in an image that appears acceptably sharp. Cameras can only focus sharply at one point. But the transition from sharp to un-sharp is gradual, and the term "acceptably sharp" is not well defined. Hyperfocal distance, at its simplest, is the focusing distance that gives images the greatest depth of field. For example, consider a landscape where in which it is desirable to capture everything foreground and background—to appear sharp. If the taking camera focuses on the foreground, the background will appear blurry in the image. And the taking camera focuses on the background, the foreground will look out of focus. To resolve this issue the taking camera can focus at a particular point between the foreground and the background, which makes both the foreground and the background elements of the scene appear reasonably sharp. This focusing point is called the hyperfocal distance.

The technical definition is the closest focusing distance that allows objects at infinity to be acceptably sharp. Infinity refers to any distant object—the horizon, for example, or stars at night. Producing content in an immersive content system also involve another concept called circle of confusion. In optics, a circle of confusion is an optical spot caused by a cone of light rays from a lens not coming to a perfect focus when imaging a point source. In photography, the circle of confusion (CoC) is used to determine the DOF, the part of an image that is acceptably sharp. Real lenses do not focus all rays perfectly, so that even at best focus, a point is imaged as a spot rather than a point. At its most basic, the CoC can be measured in millimeters and represents the size that a blurred pinpoint of light on a camera sensor that would appear due to being out of focus. A larger CoC represents a blurrier area in the image, solely due to being out of focus.

DOF correction techniques for computer-generated images can calculate a virtual aperture and apply a circle of confusion to blur out the images outside the CoC. The immersive content generation system generates computer-generated images that are then imaged again by an optical taking camera. Therefore, the immersive content generation system cannot optically correct the CoC to the virtual input that will be displayed on the LED wall. As the images displayed on the LED wall will be imaged again, the optical taking camera will apply some other non-zero CoC (e.g., cocPhysical in the explanation above), so that the total amount of CoC will be too much.

The following techniques disclose calculating a compensation factor to adjust the CoC for the virtual images. As the wall distance differs to the camera across the image, e.g., at the left side of the frame the immersive content system can look at wall that is closer to the taking camera than at the right side, due to the curvature of the wall or the angle of the camera to it. The CoC for the taking camera is wrong and not generally not varied enough due to missing the possibly wildly uneven distances of virtual objects on the wall. As the distance is the same, the system can produce a uniform or mostly uniform CoC that can be applied to every pixel within the frustum. Therefore, the system needs to calculate compensation factors such that uniform CoC will be adjusted for varying distances.

In some embodiments, the content production system may generate adjusted depth of field ("DOF") for virtual objects displayed on the displays of the content production system. More specifically, the content production system may determine attribute information for a lens used by the taking camera. The attribute information may indicate a focal length, lens aperture, and other attributes of the lens. The content production system may also determine the virtual depth of each of the virtual objects displayed on the displays of the content production system relative to the taking camera. Based on the lens attribute information and the virtual depth of each virtual object, the content production system may generate an appropriate amount of blur or "out of focus" quality for the virtual object. In this way, content including images of the virtual and physical objects can exhibit consistent blurriness.

In some embodiments, the content production system may apply a smaller amount of DOF as would normally be associated with objects having a particular distance from the taking camera. In particular, the displays presenting the virtual objects may exhibit some DOF themselves as the displays are physical objects. As such, the content production system may determine the amount of DOF associated with the displays based on the distance of the displays from the taking camera. Thereafter, the content production system may determine an amount of DOF to apply to each virtual object based on the determined amount of DOF for the displays. In particular, the content production system may reduce the amount of DOF to apply to the virtual objects by the determined amount of DOF for the displays. In this way, images of each virtual object may exhibit an appropriate amount of DOF for its given virtual distance.

Figure 11:
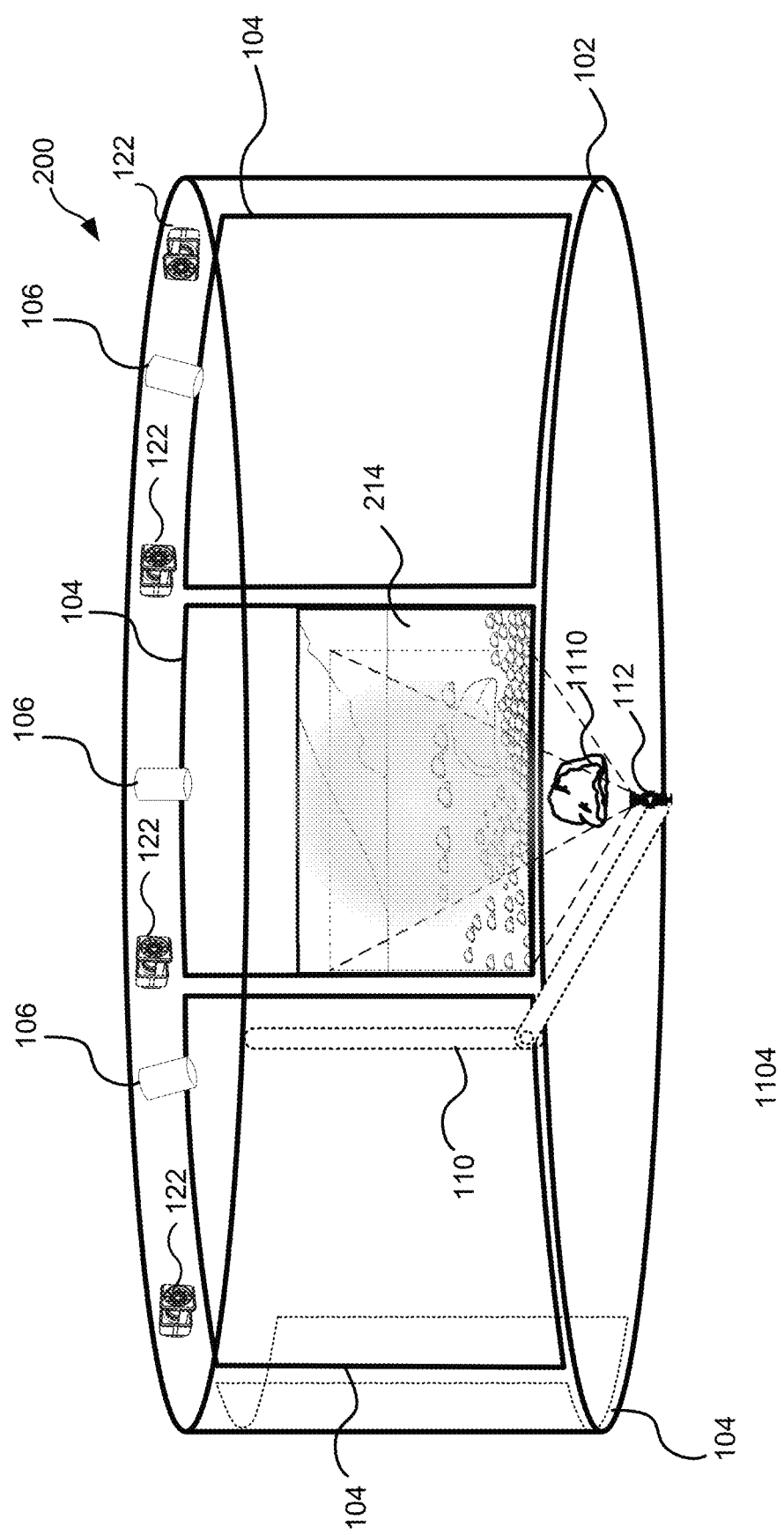
FIG. 11 illustrates an exemplary immersive content system for determining depth of field corrections.

FIG. 11 illustrates an exemplary immersive content system for determining DOF for captured images. FIG. 11 is a simplified drawing of immersive environment production system 200 from FIG. 2. FIG. 8 illustrates a physical object 1110 being captured by a taking camera 112 on a moveable rig 110 within the content production system 200 that includes displays 104 that at least partially encircle a performance area 102. Scenery images 214 can appear on the one or more displays 104. The immersive cave or walls can include supplemental lights 106 separate from displays 104 that can light the performance area 102 (including the performer) and create various desired lighting effects. The supplemental lights 106 can be LED lights. The content production system 200 can include multiple simulated lights 108 the location of each of which on the displays 104 can be selected in order to achieve a desired lighting effect. The immersive content production system 100 can further include one or more motion capture cameras 122. The motion capture cameras 122 can determine the motion of the taking camera 112. In various embodiments, one or more sensors can be attached to the taking camera 112 or the moveable rig 110.

In other embodiments, the taking camera 112 or the rig 110 can include one or more position sensors, or motion sensors (e.g., one or more accelerometers and/or gyroscopes) to determine one or more of a position, an orientation, and a motion of the taking camera 112 as the taking camera 112 moves around the performance area 102 during filming. Scenery images 214 can also provide background for the video content captured by a taking camera 112. Motion blur can be applied to the scenery images 214 to provide a DOF in the scenery images 214. As the taking camera 112 moves, the motion blur in the scenery images 214 can be adjusted to account for the position of the taking camera 112 from the taking camera 112. The DOF correction can be based on the optical characteristics of the taking camera 112 and the distance of the taking camera 112 from the display 104 and the distance of the physical object 1110 from the display 104.

Figure 12:
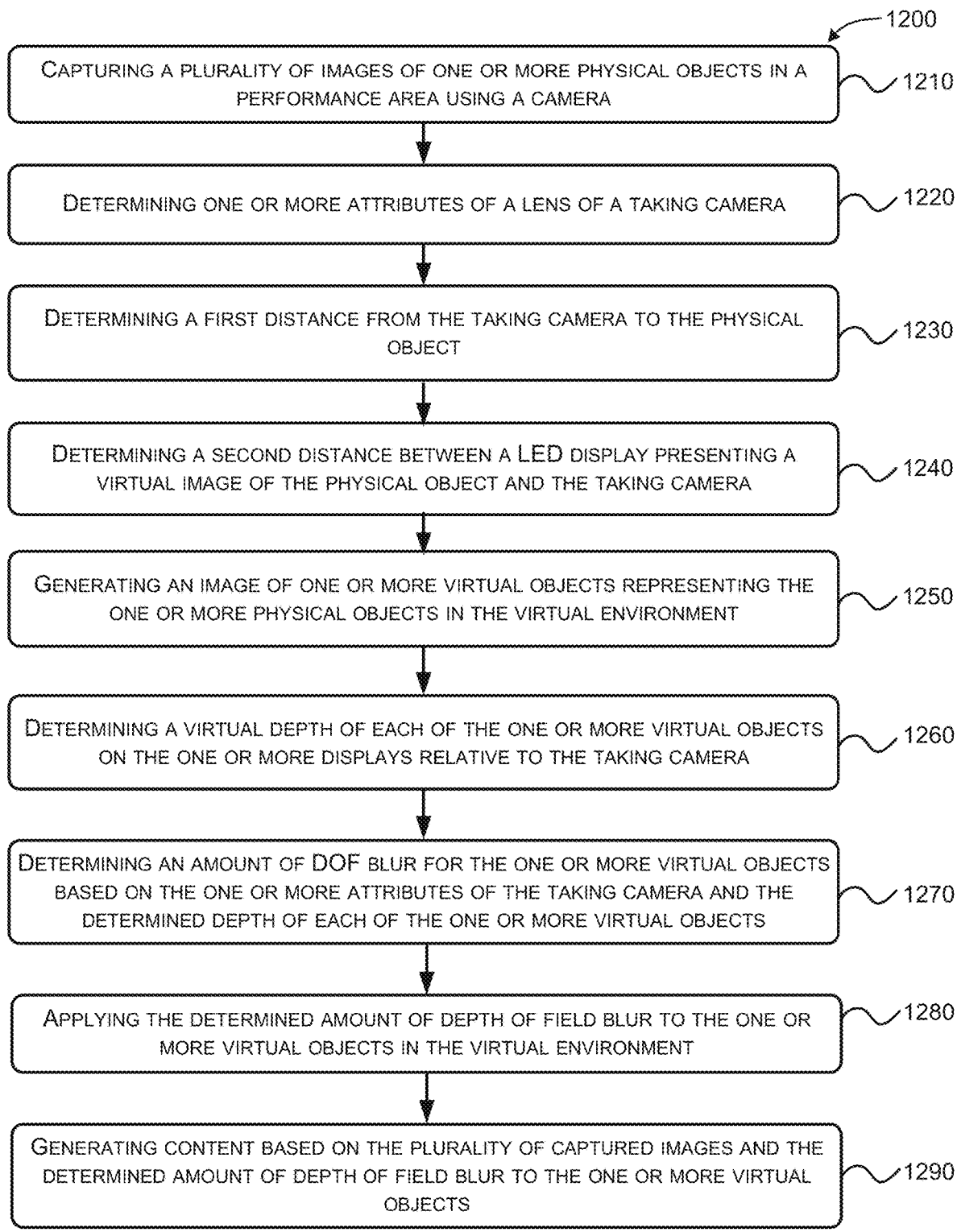
FIG. 12 illustrates an exemplary flowchart for a process for determining depth of field using an immersive content generation system.

FIG. 12 is a flow chart of an example process 1200 for DOF correction. In some implementations, one or more process blocks of FIG. 12 can be performed by an immersive content generation system. In some implementations, one or more process blocks of FIG. 12 can be performed by another device or a group of devices separate from or including the immersive content generation system.

At 1210, process 1200 can include capturing a plurality of images of one or more physical objects in a performance area using a camera, wherein the one or more physical objects are at least partially surrounded by one or more displays presenting images of a virtual environment. For example, the immersive content generation system (e.g., using processing unit 1304, system memory 1310, storage subsystem 1318, input/output subsystem 1308, displays 1332, cameras 1334, and/or the like as illustrated in FIG. 13 and described below) can capture a plurality of images of one or more physical objects in a performance area using a camera, as described above. In some implementations, the one or more physical objects are at least partially surrounded by one or more displays presenting images of a virtual environment.

At 1220, process 1200 can include determining one or more attributes of a lens of a taking camera. For example, the immersive content generation system (e.g., using processing unit 1304, system memory 1310, storage subsystem 1318, input/output subsystem 1308, cameras 1334, and/or the like as illustrated in FIG. 13 and described below) can determine one or more attributes of a lens of a taking camera, as described above. In some implementations, the one or more attributes of the lens of the taking camera includes at least one of a focal length, focus distance, and a lens aperture. In various embodiments, the one or more attributes of the taking camera can be entered via a keyboard into the immersive content generation system.

At 1230, process 1200 can include determining a first distance from the taking camera to the physical object. For example, the immersive content generation system (e.g., using a processing unit 1304, a system memory 1310, a storage subsystem 1318, an input/output subsystem 1308, one or more sensors 1340, one or more application programs 1312 and/or the like as illustrated in FIG. 13 and described below) can determine a first distance from the taking camera to the physical object, as described above. As discussed above, the position of the taking camera 112 can be determined. The position of the physical object can be determined by one or more sensors. The sensors can be affixed to the physical object (e.g., a reflective or IR sensor) or the position can be determined by one or more depth sensors. The distance can be determined by calculating a range between the taking camera 112 and the physical object.

At 1240, process 1200 can include determining a second distance between a virtual image of the physical object and the taking camera. For example, the immersive content generation system (e.g., using a processing unit 1304, a system memory 1310, a storage subsystem 1318, an input/output subsystem 1308, one or more sensors 1340, one or more application programs 1312 and/or the like as illustrated in FIG. 13 and described below) can determine a second distance between a virtual image of the physical object and the taking camera, as described above. As discussed above, the position of the taking camera 112 can be determined. The position of the LED displays 104 is known. The position of the virtual image on the display 104 can be determined based in part on the known position of the display on which the virtual images are being shown. The second distance can be calculated as a range from the taking camera and the LED display 104.

At 1250, process 1200 can include generating an image of one or more virtual objects representing the one or more physical objects in the virtual environment. For example, the immersive content generation system (e.g., using a processing unit 1304, a system memory 1310, a storage subsystem 1318, an input/output subsystem 1308, one or more cameras 1334, and/or the like as illustrated in FIG. 13 and described below) can generate an image of one or more virtual objects representing the one or more physical objects in the virtual environment, as described above.

At 1260, process 1200 can include determining a virtual depth of each of the one or more virtual objects on the one or more displays relative to the taking camera. For example, the immersive content generation system (e.g., using a processing unit 1304, a system memory 1310, a storage subsystem 1318, an input/output subsystem 1308, one or more cameras 1334, one or more sensors 1340, and/or the like as illustrated in FIG. 13 and described below) can determine a virtual depth of each of the one or more virtual objects on the one or more displays relative to the taking camera, as described above.

At 1270, process 1200 can include determining an amount of blur for the one or more virtual objects based on the one or more attributes of the taking camera and the determined depth of each of the one or more virtual objects. For example, the immersive content generation system (e.g., using a processing unit 1304, a system memory 1310, a storage subsystem 1318, an input/output subsystem 1308, one or more application programs 1312 and/or the like as illustrated in FIG. 13 and described below) can determine an amount of blur for the one or more virtual objects based on the one or more attributes of the taking camera and the determined depth of each of the one or more virtual objects, as described above.

In the DOF calculation, the immersive content system can use the first distance (e.g., distance between the camera and the physical object that is virtually displayed on the wall) and a second distance (e.g., the distance between the camera and the LED display). To describe this mathematically, the immersive content system uses a function "calculateCOC" that can take a camera with all its parameters, and the distance of point the camera observes (e.g., a point on the surface of a physical object it looks at), and the result of that function is the size of the circle of confusion of that point, where a COC of 0 means the image is fully sharp, while a COC of 1 means that single observed point gets blurred to the size of the whole image (a circle with diameter of the image plane).

COC=calculateCOC (camera,distanceToPoint)

To make the LED wall specific DOF calculation, the immersive content system needs to calculate several terms.

cocVirtual=calculateCOC(camera,distance to point on surface of virtual object)

cocPhysical=calculateCOC(camera,distance to point on LED for object's pixels)

CocPhysical is a simulation/or best guess of the amount of DOF that the physical camera will produce in this shooting situation, so the immersive content system does not want to include it in the computer generated (CG) image. CocVirtual is the calculated amount of DOF based on the distance to the object in the virtual world to the camera. It is the amount of DOF the a POSITA would give the object if it were real and the real camera would observe. So it is the goal that the immersive content system algorithm tries to achieve. If cocVirtual is smaller than cocPhysical, there is not much the immersive content system can do to the image. The physical camera will have blurred our virtual image so much, that no matter what the immersive content system can display it will not come into perfect focus again. This tends to be only the case when the camera is focused on a point behind the LED wall, which is not something a camera operator would normally do or expect to work. If cocVirtual is greater than cocPhysical, the immersive content system can try to get as close to the correct result as possible. An initial idea would be to apply this DOF to our image:

cocInCG=cocVirtual−cocPhysical

The nature of how the blur operation is a convolution in 2D though, means that subtracting two diameters is not the right math. Circle of Confusion In Computer Generated Image (cocInCG) refers to the corrected amount of DOF to apply to images in the virtual environment to correct for the DOF effects of the taking camera. These two convolutions may not be a perfectly reversible math operation, so experimentally designers of the immersive content system have found this formula to work best:

cocInCG=(1−(cocPhysical/cocVirtual)^2.5)*cocVirtual

The cocInCG value can then be applied to the image with the normal DOF calculations, just using that as the coc.

At 1280, process 1200 can include applying the determined amount of blur to the one or more virtual objects in the virtual environment. For example, the immersive content generation system (e.g., using a processing unit 1304, a system memory 1310, a storage subsystem 1318, an input/output subsystem 1308, one or more displays 1332 and/or the like as illustrated in FIG. 13 and described below) can apply the determined amount of blur to the one or more virtual objects in the virtual environment, as described above.

At 1290, process 1200 can include generating content based on the plurality of captured images and the determined amount of blur to the one or more virtual objects. For example, the immersive content generation system (e.g., using a processing unit 1304, a system memory 1310, a storage subsystem 1318, an input/output subsystem 1308, one or more cameras 1334 and/or the like as illustrated in FIG. 13 and described below) can generate content based on the plurality of captured images and the determined amount of blur to the one or more virtual objects, as described above.

Process 1200 can include additional implementations, such as any single implementation or any combination of implementations described below and/or in connection with one or more other processes described elsewhere herein. It should be appreciated that the specific steps illustrated in FIG. 12 provide particular techniques for title according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 12 can include multiple sub-steps that can be performed in various sequences as appropriate to the individual step. Furthermore, additional steps can be added or removed depending on the particular applications. One of ordinary skill in the art would recognize many variations, modifications, and alternatives.

In some implementations, the amount of blur applied to the one or more virtual objects varies based in part on a distance between the one or more physical objects and the taking camera Although FIG. 12 shows example steps of process 1200, in some implementations, process 1200 can include additional steps, fewer steps, different steps, or differently arranged steps than those depicted in FIG. 12. Additionally, or alternatively, two or more of the steps of process 1200 can be performed in parallel.

In some embodiments, the content production system may include and/or operate a real-time gaming engine or other similar real-time rendering engine. Such an engine may render 2D images from 3D data at interactive frame rates (e.g., 24, 30, 60, 90, or 120 frames per second). In one aspect, the real-time gaming engine may load the virtual environment for display on the displays surrounding the performance area. In some embodiments, the real-time gaming engine may load virtual assets into the virtual environment. The real-time gaming engine may then permit the virtual assets to interact or move according to simulated physics information stored by the real-time gaming engine. The real-time gaming engine may also update the virtual environment based on the movement and orientation of the taking camera(s).

In some embodiments, the content production system may include or present a user interface to an operator. The operator may provide input indicating the types of virtual assets and/or effects to be integrated into the virtual environment displayed during the performance. The operator may also indicate the particular configurations or trigger movements of the performer and/or physical objects in the performance area that are to be used to begin the loading and presentation of certain virtual assets. In some embodiments, the input received from the operator may occur in real-time and/or concurrently with a performance.

In one embodiment, the content production system may generate output based on the images captured by the taking cameras of the system. The output may be further processed using various post processing techniques and systems to generate content, such as movies, television programming, online or streamed videos, etc.

Each of the embodiments disclosed herein can be implemented in a special-purpose computer system. FIG. 13 illustrates a computer system 1300, in which various embodiments described herein can be implemented. The system 1300 can be used to implement any of the computer systems described above. As shown in the figure, computer system 1300 includes a processing unit 1304 that communicates with a number of peripheral subsystems via a bus subsystem 1302. These peripheral subsystems can include a processing acceleration unit 1306, an input/output (I/O) subsystem 1308, a storage subsystem 1318 and a communications subsystem 1324. The storage subsystem 1318 can include a tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem can utilize multiple buses. Bus subsystem 1302 can be any of several types of bus structures including a memory bus or memory controller, a peripheral bus, and a local bus using any of a variety of bus architectures. For example, such architectures can include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors can be included in processing unit 1304. These processors can include single core or multicore processors. In certain embodiments, processing unit 1304 can be implemented as one or more independent processing units and/or sub-processing unit 1334, 1338 with single or multicore processors included in each processing unit. In other embodiments, processing unit 1304 can also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processing unit 1304 and/or in storage subsystem 1318. Through suitable programming, processing unit 1304 can provide various functionalities described above. Computer system 1300 can additionally include a processing acceleration unit 1306, which can include a digital signal processor (DSP), a special-purpose processor, and/or the like. And, in some embodiments, the processing unit or another component of system 1300 can include and/or operate a real-time gaming engine or other similar real-time rendering engine. Such an engine can render two-dimensional (2D) images from 3D data at interactive frame rates (e.g., 24, 48, 72, 96, or more frames per second). In one aspect, the real-time gaming engine can load the virtual environment for display on the displays surrounding the performance area. In some embodiments, the real-time gaming engine can load virtual assets into the virtual environment. The real-time gaming engine can then permit the virtual assets to interact or move according to simulated physics information stored by the real-time gaming engine. The real-time gaming engine can also update the virtual environment based on the movement and orientation of the taking camera(s).

I/O subsystem 1308 can include user interface input devices and user interface output devices. User interface input devices can include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices can include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices can also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices can include voice recognition sensing devices that enable users to interact with voice recognition systems (e.g., Siri® navigator), through voice commands. In some embodiments, the user interface devices enable an operator to provide input indicating the types of virtual assets and/or effects to be integrated into the virtual environment displayed during the performance. The operator can also indicate the particular configurations or trigger movements of the performer and/or physical objects in the performance area that are to be used to begin the loading and presentation of certain virtual assets. In some embodiments, the input received from the operator can occur in real-time and/or concurrently with a performance The system 1300 can include one or more sensors 1340. The sensors 1340 can include accelerometers, motion sensing cameras depth sensors, and/or gyrometers. The sensors 1340 can be installed on the taking camera 112 or the moveable rig 110.

The system 1300 can include one or more displays 1332. The displays 1332 can be the displays 104 depicted in FIG. 1. The displays 1332 can form an enclosed performance area. In some embodiments, the displays 1332 can be formed from multiple light emitting diode (LED) panels. In some embodiments, the displays 1332 can be formed via multiple liquid crystal display (LCD) panels or thin-film transistor (TFT) liquid-crystal display (LCD) panels.

The system 1300 can include one or more cameras 1334. The one or more cameras can be digital cameras. Digital cinematography captures motion pictures digitally in a process analogous to digital photography. Professional cameras can include the Sony CineAlta (F) Series, Blackmagic Cinema Camera, RED ONE, Arriflex D-20, D-21 and Alexa, Panavisions Genesis, Silicon Imaging SI-2K, Thomson Viper, Vision Research Phantom, IMAX 3D camera based on two Vision Research Phantom cores, Weisscam HS-1 and HS-2, GS Vitec noX, and the Fusion Camera System. Digital cinematography cameras can capture images using complementary metal-oxide semiconductor (CMOS) or charge coupled device (CCD) sensors, usually in one of two arrangements. Single chip cameras that are designed specifically for the digital cinematography market often use a single sensor (much like digital photo cameras), with dimensions similar in size to a 16 or 35 mm film frame or even (as with the Vision 65) a 65 mm film frame. An image can be projected onto a single large sensor exactly the same way it can be projected onto a film frame, so cameras with this design can be made with positive lock (PL), Panavision (PV) and similar mounts, in order to use the wide range of existing high-end cinematography lenses available. Their large sensors also let these cameras achieve the same shallow depth of field as 35 or 65 mm motion picture film cameras, which many cinematographers consider an essential visual tool.

Unlike other video formats, which are specified in terms of vertical resolution (for example, 1080p, which is 1920×1080 pixels), digital cinema formats are usually specified in terms of horizontal resolution. As a shorthand, these resolutions are often given in "nK" notation, where n is the multiplier of 1324 such that the horizontal resolution of a corresponding full-aperture, digitized film frame is exactly 1024n pixels.

For instance, a 2K image is 2048 pixels wide, and a 4K image is 4096 pixels wide. Vertical resolutions vary with aspect ratios though; so a 2K image with an HDTV (16:9) aspect ratio is 2048×1152 pixels, while a 2K image with a standard definition television (SDTV) or Academy ratio (4:3) is 2048×1536 pixels, and one with a Panavision ratio (2.39:1) would be 2048×856 pixels, and so on. Due to the "nK" notation not corresponding to specific horizontal resolutions per format a 2K image lacking, for example, the typical 35 mm film soundtrack space, is only 1828 pixels wide, with vertical resolutions rescaling accordingly.

All formats designed for digital cinematography are progressive scan, and capture usually occurs at the same 24 frame per second rate established as the standard for 35 mm film. Some films have a High Frame Rate of 48 fps, although most traditional theaters use 24 fps. The Digital Cinema Initiative (DCI) standard for cinema usually relies on a 1.89:1 aspect ratio, thus defining the maximum container size for 4K as 4096×2160 pixels and for 2K as 2048×1080 pixels.

Broadly, several workflow paradigms can be used for data acquisition and storage in digital cinematography. With video-tape-based workflow, video is recorded to tape on set. This video is then ingested into a computer running non-linear editing software, using a deck. Upon ingestion, a digital video stream from tape is converted to computer files. These files can be edited directly or converted to an intermediate format for editing. Then video is output in its final format, possibly to a film recorder for theatrical exhibition, or back to video tape for broadcast use. Original video tapes are kept as an archival medium. The files generated by the non-linear editing application contain the information necessary to retrieve footage from the proper tapes, should the footage stored on the computer's hard disk be lost. With increasing convenience of file-based workflows, the tape-based workflows have become marginal in recent years.

Digital cinematography can use tapeless or file-based workflows. This trend has accelerated with increased capacity and reduced cost of non-linear storage solutions such as hard disk drives, optical discs, and solid-state memory. With tapeless workflows digital video is recorded as digital files onto random-access media like optical discs, hard disk drives or flash memory-based digital magazines. These files can be easily copied to another storage device, typically to a large RAID (array of computer disks) connected to an editing system. Once data is copied from the on-set media to the storage array, they are erased and returned to the set for more shooting.

Such RAID arrays, both of managed (for example, storage area networks (SANs) and networked attached storage (NASs) and unmanaged (for example, just a bunch of disks (JBoDs) on a single computer workstation), are necessary due to the throughput required for real-time (320 Megabits per second for 2K @ 24 frames per second) or near-real-time playback in post-production, compared to throughput available from a single, yet fast, hard disk drive. Such requirements are often termed as on-line or cloud storage. Post-production not requiring real-time playback performances (typically for lettering, subtitling, versioning and other similar visual effects) can be migrated to slightly slower RAID stores.

Short-term archiving, if ever, is accomplished by moving the digital files into slower redundant array of independent disks (RAID) arrays (either managed and unmanaged type, but with lower performances), where playback capability is poor to non-existent (unless via proxy images), but minimal editing and metadata harvesting still feasible. Such intermediate requirements easily fall into the mid-line storage category.

Long-term archiving is accomplished by backing up the digital files from the RAID, using standard practices and equipment for data backup from the information technology industry, often to data tapes (like linear tape open (LTOs)).

The system can include one or more spherical cameras. A spherical camera can be called an omnidirectional camera, also known as 360-degree camera, is a camera having a field of view that covers approximately the entire sphere or at least a full circle in the horizontal plane. 360-degree videos, also known as immersive videos, or spherical videos, are video recordings where a view in every direction is recorded at the same time, shot using an omnidirectional camera or a collection of cameras. During playback on normal flat display the viewer has control of the viewing direction like a panorama. It can also be played on a displays or projectors arranged in a sphere or some part of a sphere.

360-degree video is typically recorded using either a special rig of multiple cameras, or using a dedicated camera that contains multiple camera lenses embedded into the device, and filming overlapping angles simultaneously. Through a method known as video stitching, this separate footage is merged into one spherical video piece, and the color and contrast of each shot is calibrated to be consistent with the others. This process is done either by the camera itself, or using specialized software that can analyze common visuals and audio to synchronize and link the different camera feeds together. Generally, the only area that cannot be viewed is the view toward the camera support.

360-degree video is typically formatted in an equirectangular projection and is either monoscopic, with one image directed to both eyes, or stereoscopic, viewed as two distinct images directed individually to each eye for a 3D effect. Due to this projection and stitching, equirectangular video exhibits a lower quality in the middle of the image than at the top and bottom.

Specialized omnidirectional cameras and rigs have been developed for the purpose of filming 360-degree video, including rigs such as GoPro's Omni and Odyssey (which consist of multiple action cameras installed within a frame), and contained cameras like the HumanEyes Vuze and Nokia OZO, There have also been handheld dual-lens cameras such as the Ricoh Theta S, Samsung Gear 360, Garmin VIRB 360, and the Kogeto Dot 360—a panoramic camera lens accessory developed for the iPhone 4, 4S, and Samsung Galaxy Nexus.

User interface input devices can also include, without limitation, three dimensional (3-D) mice, joysticks or pointing sticks, gamepads and graphic tablets, and audio/visual devices such as speakers, digital cameras, digital camcorders, portable media players, webcams, image scanners, fingerprint scanners, barcode reader 3-D scanners, 3-D printers, laser rangefinders, and eye gaze monitoring devices. Additionally, user interface input devices can include, for example, medical imaging input devices such as computed tomography, magnetic resonance imaging, position emission tomography, medical ultrasonography devices. User interface input devices can also include, for example, audio input devices such as musical instrument digital interface (MIDI) keyboards, digital musical instruments and the like.

User interface output devices can include a display subsystem, indicator lights, or non-visual displays such as audio output devices, etc. The display subsystem can be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices can include, without limitation, a variety of display devices that visually convey text, graphics and audio/video information such as monitors, printers, speakers, headphones, automotive navigation systems, plotters, voice output devices, and modems.

Computer system 1300 can comprise a storage subsystem 1318 that comprises software elements, shown as being currently located within a system memory 1310. System memory 1310 can store program instructions that are loadable and executable on processing unit 1304, as well as data generated during the execution of these programs.

Depending on the configuration and type of computer system 1300, system memory 1310 can be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 can include multiple different types of memory, such as static random access memory (SRAM) or dynamic random access memory (DRAM). In some implementations, a basic input/output system (BIOS), containing the basic routines that help to transfer information between elements within computer system 1300, such as during start-up, can typically be stored in the ROM. By way of example, and not limitation, system memory 1310 also illustrates application programs 1312, which can include client applications, web browsers, mid-tier applications, relational database management systems (RDBMS), etc., program data 1314, and an operating system 1316. By way of example, operating system 1316 can include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1318 can also provide a tangible computer-readable storage medium for storing the basic programming and data constructs that provide the functionality of some embodiments. Software (programs, code modules, instructions) that when executed by a processor provide the functionality described above can be stored in storage subsystem 1318. These software modules or instructions can be executed by processing unit 1304. Storage subsystem 1318 can also provide a repository for storing data used in accordance with the present invention.

Storage subsystem 1318 can also include a computer-readable storage media reader 1320 that can further be connected to computer-readable storage media 1322. Together and, optionally, in combination with system memory 1310, computer-readable storage media 1322 can comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, compact disc read only memory (CD-ROM), digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 can include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1322 can include, but is not limited to, Zip® drives, flash memory cards, universal serial bus (USB) flash drives, secure digital (SD) cards, DVD disks, digital video tape, and the like. Computer-readable storage media 1322 can also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random-access memory (DRAM)-based SSDs, magnetoresistive RAM (MRAM) SSDs, and hybrid SSDs that use a combination of DRAM and flash memory based SSDs. The disk drives and their associated computer-readable media can provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 can enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (Institute of Electrical and Electronics Engineers (IEEE) 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 can also receive input communication in the form of structured and/or unstructured data feeds 1326, event streams 1328, event updates 1330, and the like on behalf of one or more users who can use computer system 1300.

By way of example, communications subsystem 1324 can be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 can also be configured to receive data in the form of continuous data streams, which can include event streams 1328 of real-time events and/or event updates 1330 that can be continuous or unbounded in nature with no explicit end. Examples of applications that generate continuous data can include, for example, sensor data applications, financial tickers, network performance measuring tools (e.g. network monitoring and traffic management applications), clickstream analysis tools, automobile traffic monitoring, and the like.

Communications subsystem 1324 can also be configured to output the structured and/or unstructured data feeds 1326, event streams 1328, event updates 1330, and the like to one or more databases that can be in communication with one or more streaming data source computers coupled to computer system 1300.

Computer system 1300 can be one of various types, including a handheld portable device (e.g., an iPhone® cellular phone, an iPad® computing tablet, a personal digital assistant (PDA)), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, can be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention can be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes can be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments can be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations can be re-arranged. A process is terminated when its operations are completed, but could have additional steps not included in a figure. A process can correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc., can be passed, forwarded, or transmitted via any suitable means including memory sharing, message passing, token passing, network transmission, etc.

Furthermore, embodiments can be implemented by hardware, software, firmware, middleware, microcode, hardware description languages, or any combination thereof. When implemented in software, firmware, middleware or microcode, the program code or code segments to perform the necessary tasks can be stored in a machine-readable medium. A processor(s) can perform the necessary tasks.

In the foregoing specification, aspects of the invention are described with reference to specific embodiments thereof, but those skilled in the art will recognize that the invention is not limited thereto. Various features and aspects of the above-described invention can be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method of generating content, the computer-implemented method comprising:
   capturing a plurality of images of a physical object in a performance area using a taking camera, wherein the physical object is at least partially surrounded by one or more displays presenting images of a virtual environment;
   determining one or more attributes of a lens of the taking camera;
   determining a first distance from the taking camera to the physical object;
   determining a second distance between a light emitting diode (LED) display presenting a virtual image of the physical object and the taking camera;
   generating an image of one or more virtual objects representing one or more physical objects in the virtual environment;
   determining a virtual depth of each of the one or more virtual objects on the one or more displays relative to the taking camera based at least in part on the first distance and the second distance;
   determining an amount of depth of field blur for the one or more virtual objects based on the one or more attributes of the taking camera and the determined virtual depth of each of the one or more virtual objects;
   applying the determined amount of depth of field blur to the one or more virtual objects in the virtual environment; and
   generating the content based on the plurality of captured images and the determined amount of depth of field blur to the one or more virtual objects.

2. The computer-implemented method of claim 1, wherein the determined amount of depth of field blur applied to the one or more virtual objects varies based in part on the first distance.

3. The computer-implemented method of claim 1, wherein the one or more attributes of the lens of the taking camera includes at least one of a focal length and a lens aperture.

4. The computer-implemented method of claim 1, further comprising determining a physical circle of confusion, wherein the physical circle of confusion is a simulation of the determined amount of depth of field blur that the taking camera will produce.

5. The computer-implemented method of claim 4, further comprising determine a virtual circle of confusion, wherein the virtual circle of confusion is a calculated amount of depth of field blur based at least in part on the second distance of the one or more virtual objects in the virtual environment to the taking camera.

6. The method of claim 5, further comprising calculating a corrected circle of confusion in a computer generated image based at least in part in a corrected amount of depth of field blur to apply to the images of the virtual environment to correct for depth of field effects of the taking camera.

7. The computer-implemented method of claim 1, further comprising rendering two-dimensional images from three-dimensional data at interactive frame rates using a real time gaming engine.

8. A immersive content generation system, comprising:
   one or more memories storing instructions; and
   one or more processors communicatively coupled to the one or more memories, that execute the instructions to perform operations comprising:
      capturing a plurality of images of a physical object in a performance area using a taking camera, wherein the physical object is at least partially surrounded by one or more displays presenting images of a virtual environment;
      determining one or more attributes of a lens of the taking camera;
      determining a first distance from the taking camera to the physical object;
      determining a second distance between a light emitting diode (LED) display presenting a virtual image of the physical object and the taking camera;
      generating an image of one or more virtual objects representing one or more physical objects in the virtual environment;
      determining a virtual depth of each of the one or more virtual objects on the one or more displays relative to the taking camera based at least in part on the first distance and the second distance;
      determining an amount of depth of field blur for the one or more virtual objects based on the one or more attributes of the taking camera and the determined virtual depth of each of the one or more virtual objects;
      applying the determined amount of depth of field blur to the one or more virtual objects in the virtual environment; and
      generating content based on the plurality of captured images and the determined amount of depth of field blur to the one or more virtual objects.

9. The immersive content generation system of claim 8, wherein the determined amount of depth of field blur applied to the one or more virtual objects varies based in part on the first distance.

10. The immersive content generation system of claim 8, wherein the one or more attributes of the lens of the taking camera includes at least one of a focal length and a lens aperture.

11. The immersive content generation system of claim 8, wherein the operations further comprise determining a physical circle of confusion, wherein the physical circle of confusion is a simulation of the determined amount of depth of field blur that the taking camera will produce.

12. The immersive content generation system of claim 11, wherein the operations further comprise determining a virtual circle of confusion, wherein the virtual circle of confusion is a calculated amount of depth of field blur based at least in part on the second distance of the one or more virtual objects in the virtual environment to the taking camera.

13. The immersive content generation system of claim 12, wherein the operations further comprise determining calculating a corrected circle of confusion in a computer generated image based at least in part in a corrected amount of depth of field blur to apply to the images of the virtual environment to correct for depth of field effects of the taking camera.

14. The immersive content generation system of claim 8, wherein the operations further comprise rendering two-dimensional images from three-dimensional data at interactive frame rates using a real time gaming engine.

15. A non-transitory computer-readable medium storing instructions, that when executed by one or more processors, cause the one or more processors to perform operations comprising:
    capturing a plurality of images of a physical object in a performance area using a taking camera, wherein the physical object is at least partially surrounded by one or more displays presenting images of a virtual environment;
    determining one or more attributes of a lens of the taking camera;
    determining a first distance from the taking camera to the physical object;
    determining a second distance between a light emitting diode (LED) display presenting a virtual image of the physical object and the taking camera;
    generating an image of one or more virtual objects representing one or more physical objects in the virtual environment;
    determining a virtual depth of each of the one or more virtual objects on the one or more displays relative to the taking camera based at least in part on the first distance and the second distance;
    determining an amount of depth of field blur for the one or more virtual objects based on the one or more attributes of the taking camera and the determined virtual depth of each of the one or more virtual objects;
    applying the determined amount of depth of field blur to the one or more virtual objects in the virtual environment; and
    generating content based on the plurality of captured images and the determined amount of depth of field blur to the one or more virtual objects.

16. The non-transitory computer-readable medium of claim 15, wherein the determined amount of depth of field blur applied to the one or more virtual objects varies based in part on the first distance.

17. The non-transitory computer-readable medium of claim 15, wherein the one or more attributes of the lens of the taking camera includes at least one of a focal length and a lens aperture.

18. The non-transitory computer-readable medium of claim 15, wherein the operations further comprise determining a physical circle of confusion, wherein the physical circle of confusion is a simulation of the determined amount of depth of field blur that the taking camera will produce.

19. The non-transitory computer-readable medium of claim 18, wherein the operations further comprise a virtual circle of confusion, wherein the virtual circle of confusion is a calculated amount of depth of field blur based at least in part on the second distance of the one or more virtual objects in the virtual environment to the taking camera.

20. The non-transitory computer-readable medium of claim 19, wherein the operations further comprise calculating a corrected circle of confusion in a computer generated image based at least in part in a corrected amount of depth of field blur to apply to the images of the virtual environment to correct for depth of field effects of the taking camera.

* * * * *